United States Patent
Komukai et al.

(10) Patent No.: US 10,950,855 B2
(45) Date of Patent: Mar. 16, 2021

(54) POSITIVE ELECTRODE ACTIVE MATERIAL FOR NONAQUEOUS ELECTROLYTE SECONDARY BATTERY, AND NONAQUEOUS ELECTROLYTE SECONDARY BATTERY USING THE POSITIVE ELECTRODE ACTIVE MATERIAL

(71) Applicant: SUMITOMO METAL MINING CO., LTD., Tokyo (JP)

(72) Inventors: Tetsufumi Komukai, Niihama (JP); Yuki Furuichi, Niihama (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 89 days.

(21) Appl. No.: 15/771,147

(22) PCT Filed: Oct. 3, 2016

(86) PCT No.: PCT/JP2016/079303
§ 371 (c)(1),
(2) Date: Apr. 26, 2018

(87) PCT Pub. No.: WO2017/073246
PCT Pub. Date: May 4, 2017

(65) Prior Publication Data
US 2018/0337403 A1    Nov. 22, 2018

(30) Foreign Application Priority Data
Oct. 26, 2015  (JP) .............................. JP2015-209492

(51) Int. Cl.
*H01M 4/525* (2010.01)
*H01M 4/36* (2006.01)
(Continued)

(52) U.S. Cl.
CPC ............ *H01M 4/525* (2013.01); *C01G 53/42* (2013.01); *H01M 4/366* (2013.01); *H01M 4/62* (2013.01);
(Continued)

(58) Field of Classification Search
CPC ........ H01M 4/48; H01M 4/483–4/485; H01M 4/50–4/505; H01M 4/52–4/525; H01M 4/36–4/366
See application file for complete search history.

(56) References Cited

U.S. PATENT DOCUMENTS 9,130,212 B1 * 9/2015 Kokado ................ B82Y 30/00
10,177,373 B2 * 1/2019 Yokoyama ............ H01M 4/36
(Continued)

FOREIGN PATENT DOCUMENTS

JP    2002075367        * 3/2002
WO   WO-2012043783 A1 * 4/2012 ............ C01G 53/42
(Continued)

OTHER PUBLICATIONS

JP2002075367 English translation. Odakawa et al. Japan. Mar. 15, 2002. (Year: 2002).*

*Primary Examiner* — Christopher P Domone
(74) *Attorney, Agent, or Firm* — Kratz, Quintos & Hanson, LLP

(57) ABSTRACT

A positive electrode active material for a nonaqueous electrolyte secondary battery is provided, which can establish both high capacity and high output when used for a positive electrode material.

A positive electrode active material for a nonaqueous electrolyte secondary battery comprises primary particles of a lithium-nickel composite oxide represented by the following general formula (1) and secondary particles composed by aggregation of the primary particles, wherein a 1-nm to (Continued)

200-nm thick film containing W and Li is present on the surface of the primary particles, and a c-axis length in the LiNi composite oxide crystal ranges from 14.183 to 14.205 angstroms.

$$\text{General formula: } Li_bNi_{1-x-y}Co_xM_yO_2 \quad (1)$$

(In the formula, M is at least one type of element selected from Mg, Al, Ca, Ti, V, Cr, Mn, Nb, Zr and Mo, and $0.95 \leq b \leq 1.03$, $0 < x \leq 0.15$, $0 < y \leq 0.07$, and $x+y \leq 0.16$ are satisfied.)

8 Claims, 3 Drawing Sheets

(51) Int. Cl.
  *H01M 10/0525* (2010.01)
  *H01M 4/62* (2006.01)
  *C01G 53/00* (2006.01)
  *H01M 4/02* (2006.01)

(52) U.S. Cl.
  CPC ...... *C01P 2002/52* (2013.01); *C01P 2002/77* (2013.01); *C01P 2004/50* (2013.01); *C01P 2004/61* (2013.01); *C01P 2004/80* (2013.01); *C01P 2004/86* (2013.01); *C01P 2006/12* (2013.01); *C01P 2006/14* (2013.01); *C01P 2006/40* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2014/0087263 A1* | 3/2014 | Matsumoto | H01M 4/505 429/223 |
| 2014/0329146 A1* | 11/2014 | Niina | H01M 4/505 429/223 |
| 2016/0372748 A1* | 12/2016 | Nakayama | C01G 53/42 |

FOREIGN PATENT DOCUMENTS

| | | | | |
|---|---|---|---|---|
| WO | WO-2013015069 A1 * | 1/2013 | | H01M 4/505 |
| WO | WO-2015008582 A1 * | 1/2015 | | |

* cited by examiner

POSITIVE ELECTRODE ACTIVE MATERIAL FOR NONAQUEOUS ELECTROLYTE SECONDARY BATTERY, AND NONAQUEOUS ELECTROLYTE SECONDARY BATTERY USING THE POSITIVE ELECTRODE ACTIVE MATERIAL

TECHNICAL FIELD

The present invention relates to a positive electrode active material for a nonaqueous electrolyte secondary battery, and a nonaqueous electrolyte secondary battery using the positive electrode active material.

BACKGROUND ART

In recent years, the demand of nonaqueous electrolyte secondary batteries as power supplies capable of charging and discharging is sharply increasing as the rapid expansion of the spread of small electronic equipment such as cellular phones and notebook personal computers.

A lithium-cobalt composite oxide represented by a lithium cobalt dioxide ($LiCoO_2$), a lithium-nickel composite oxide represented by a lithium nickel dioxide ($LiNiO_2$), a lithium-manganese composite oxide represented by a lithium manganese dioxide ($LiMnO_2$) and the like are broadly used as positive electrode active materials for the nonaqueous electrolyte secondary batteries.

Meanwhile, the lithium cobalt dioxide is problematic in that it is expensive because of its low reserves, and contains as a main component cobalt the supply of which is unstable and the price fluctuation thereof is large. Accordingly, a lithium-nickel composite oxide or a lithium-manganese composite oxide containing relatively inexpensive nickel or manganese as a main component is attracting attention in view of cost.

However, a lithium manganese dioxide is better than a lithium cobalt dioxide in terms of thermostability, but the lithium manganese dioxide has significantly low charge and discharge capacity compared with other materials, and significantly short life indicated by its charge and discharge cycle characteristic, and thus has many practical problems as batteries. On the other hand, a lithium nickel dioxide exhibits charge and discharge capacity greater than that of the lithium cobalt dioxide, and thus is expected as a positive electrode active material, with which a battery having a high energy density can be produced at low cost.

The lithium nickel dioxide is generally produced by mixing and firing a lithium compound and a nickel compound such as a nickel hydroxide or a nickel oxyhydroxide, in the form of powder of monodispersed primary particles or powder of secondary particles composed by aggregation of primary particles to have voids. However, both forms have a disadvantage such that the thermostability at state-of-charge (SOC) is inferior to that of the lithium cobalt dioxide.

Specifically, a pure lithium nickel dioxide is problematic in thermostability, charge and discharge cycle characteristic, and the like, and cannot be used as a practical battery. This is because the stability of the crystal structure at state-of-charge (SOC) is lower than that of the lithium cobalt dioxide.

Therefore in general, nickel elements in a lithium-nickel composite oxide are partially substituted with other substances in order to stabilize the crystal structure when lithium is absent in a charging process and to obtain a lithium-nickel composite oxide having good thermostability and good charge and discharge cycle characteristic as a positive electrode active material.

For example, Patent Literature 1 proposes a nonaqueous battery in which $Li_aM_bNi_cCo_dO_e$ (M is at least one type of metal selected from the group consisting of Al, Mn, Sn, In, Fe, V, Cu, Mg, Ti, Zn, and Mo, and $0<a<1.3$, $0.02\leq b\leq 0.5$, $0.02\leq d/c+d\leq 0.9$, $1.8<e<2.2$, and $b+c+d=1$ are satisfied) is used as a positive electrode active material.

Furthermore, a technique for water washing a lithium nickel dioxide after firing has been developed as a method for improving the thermostability of a lithium-nickel composite oxide.

For example, Patent Literature 2 proposes a method for producing a positive electrode active material for a nonaqueous electrolyte secondary battery, which involves roasting a nickel hydroxide or a nickel oxyhydroxide under an air atmosphere at temperatures ranging from 600° C. to 1100° C. so as to prepare a nickel oxide, mixing with a lithium compound, firing the mixture under an oxygen atmosphere at the highest temperature between 650° C. and 850° C., water washing the thus obtained fired powder in water within the time satisfying $A\leq B/40$ (in the formula, A denotes the time for water washing represented in minutes, and B denotes the slurry concentration of fired powder represented in g/L.), filtering and drying.

However, when nickel elements in the lithium-nickel composite oxide are partially substituted with other substances, that is, when a large quantity of the element is substituted (in other words, a state in which the nickel proportion is lowered), the thermostability is enhanced, but the battery capacity is lowered. On the other hand, when a small quantity of the element is substituted (in other words, a state in which the nickel proportion is increased) in order to avoid a decrease in battery capacity, the thermostability is not sufficiently improved. Moreover, there is another problem such that an increased nickel proportion tends to cause cation mixing upon firing, making synthesis difficult.

Furthermore, when a lithium nickel dioxide after firing is subjected to water washing and then the resultant is employed for a nonaqueous electrolyte secondary battery, the thus obtained positive electrode active material is supposed to have high capacity, good thermostability and good storage characteristics under a high-temperature environment. However, positive electrode active materials sufficiently satisfying the requirements of increased capacity and increased output are yet to be obtained.

Meanwhile, a method of adding a tungsten compound to a lithium-nickel composite oxide has been studied in order to improve output characteristics.

For example, Patent Literature 3 proposes a positive electrode active material for a nonaqueous electrolyte secondary battery, having fine particles containing W and Li on the surface of primary particles of lithium metal composite oxide powder, consisting of the primary particles represented by a general formula $Li_zNi_{1-x-y}Co_xM_yO_2$ (where $0.10\leq x\leq 0.35$, $0\leq y\leq 0.35$, $0.97\leq z\leq 1.20$, M is at least one type of element selected from Mn, V, Mg, Mo, Nb, Ti and Al) and secondary particles composed by aggregation of the primary particles. Patent Literature 3 suggests that the presence of the fine particles containing W and Li on the surface of the positive electrode material facilitates the intercalation of Li ions between the surface and an electrolytic solution to reduce positive electrode reaction resistance, so that the output of the battery can be increased.

However, the above positive electrode active material has improved output characteristics because of the presence of the compound containing W and Li in the form of fine particles, but its effect is limited. Moreover, the output characteristics are improved, but the nickel proportion is low, and thus the positive electrode active material is desired to have even higher capacity. In addition, if the nickel proportion is increased, thermostability should also be studied.

Therefore, although various lithium-nickel composite oxides having nickel elements partially substituted with other substances have been developed, currently a positive electrode active material comprising a lithium-nickel composite oxide, capable of sufficiently satisfying the requirements of increased capacity and increased output when employed for a nonaqueous electrolyte secondary battery, has not been obtained.

CITATION LIST

Patent Literature

[Patent Literature 1] Japanese Patent Laid-Open Publication No. H05-242891 (1993)
[Patent Literature 2] Japanese Patent Laid-Open Publication No. 2007-273108
[Patent Literature 3] Japanese Patent Laid-Open Publication No. 2012-079464

SUMMARY OF INVENTION

Technical Problem

In view of the above problems, an object of the present invention is to provide a positive electrode active material for a nonaqueous electrolyte secondary battery capable of establishing both high capacity and high output when used for a positive electrode material, and a high capacity, high output, and highly safe nonaqueous electrolyte secondary battery employing the positive electrode active material.

Solution to Problem

The present inventors have intensively studied the powder properties of a lithium metal composite oxide used as a positive electrode active material for a nonaqueous electrolyte secondary battery, and the effects thereof on the positive electrode resistance of the battery to achieve the above object. As a result, the present inventors have obtained a finding that both high capacity and high output can be established by controlling the crystal structure of a lithium-nickel composite oxide having an increased nickel proportion, and forming a 1-nm to 200-nm thick compound film containing W and Li on the surface of primary particles composing the lithium-nickel composite oxide.

The positive electrode active material for a nonaqueous electrolyte secondary battery of a 1$^{st}$ invention is a positive electrode active material for a nonaqueous electrolyte secondary battery, comprising primary particles of a lithium-nickel composite oxide represented by the following general formula (1) and secondary particles composed by aggregation of the above-primary particles, wherein a film having a thickness of 1 nm to 200 nm and containing W and Li is present on the surface of the primary particles, and a c-axis length in the crystal of the lithium-nickel composite oxide is 14.183 angstroms or more and 14.205 angstroms or less, as determined by Rietveld analysis on X-ray diffraction.

(Chemical Formula 1)

General formula: $Li_bNi_{1-x-y}Co_xM_yO_2$ (1)

(In the formula, M is at least one type of element selected from Mg, Al, Ca, Ti, V, Cr, Mn, Nb, Zr and Mo, b is a numerical value satisfying $0.95 \leq b \leq 1.03$, x is a numerical value satisfying $0 < x \leq 0.15$, y is a numerical value satisfying $0 < y \leq 0.07$, and x+y is a numerical value satisfying $x+y \leq 0.16$.)

The positive electrode active material for a nonaqueous electrolyte secondary battery of a 2$^{nd}$ invention is the positive electrode active material in the 1$^{st}$ invention, wherein a porosity of void parts including a film containing tungsten and lithium ranges from 0.5% to 4.0%, as determined by the cross-sectional observation of the secondary particles.

The positive electrode active material for a nonaqueous electrolyte secondary battery of a 3$^{rd}$ invention is the positive electrode active material in the 1$^{st}$ invention or the 2$^{nd}$ invention, wherein the number of tungsten atoms contained in the film containing tungsten and lithium accounts for 0.1 atom % to 3.0 atom % with respect to the total number of Ni, Co and M atoms contained in the lithium-nickel composite oxide of the primary particles.

The positive electrode active material for a nonaqueous electrolyte secondary battery of a 4$^{th}$ invention is the positive electrode active material in any one of the 1$^{st}$ invention to the 3$^{rd}$ invention, which is represented by the following general formula (2).

(Chemical Formula 2)

General formula: $Li_bNi_{1-x-y}Co_xM_yW_zO_{2+\alpha}$ (2)

(In the formula, M is at least one type of element selected from Mg, Al, Ca, Ti, V, Cr, Mn, Nb, Zr and Mo, and b is a numerical value satisfying $0.95 < b \leq 1.10$, x is a numerical value satisfying $0 < x \leq 0.15$, y is a numerical value satisfying $0 < y \leq 0.07$, x+y is a numerical value satisfying $x+y \leq 0.16$, z is a numerical value satisfying $0.001 \leq z \leq 0.03$, and $\alpha$ is a numerical value satisfying $0 \leq \alpha \leq 0.2$.)

The positive electrode active material for a nonaqueous electrolyte secondary battery of a 5$^{th}$ invention is the positive electrode active material in any one of the 1$^{st}$ invention to the 4$^{th}$ invention, wherein W and Li contained in the film are present in the form of lithium tungstate.

The positive electrode active material for a nonaqueous electrolyte secondary battery of a 6$^{th}$ invention is the positive electrode active material in any one of the 1$^{st}$ invention to the 5$^{th}$ invention, wherein the lithium-nickel composite oxide has a mean particle diameter ranging from 5 µm to 30 µm.

The positive electrode active material for a nonaqueous electrolyte secondary battery of a 7$^{th}$ invention is the positive electrode active material in any one of the 1$^{st}$ invention to the 6$^{th}$ invention, which has the film on the surface of the primary particles, and has fine particles containing tungsten and lithium and having a diameter ranging from 1 nm to 200 nm.

The nonaqueous electrolyte secondary battery of an 8$^{th}$ invention is a nonaqueous electrolyte secondary battery having the positive electrode active materials for nonaqueous electrolyte secondary batteries of the 1$^{st}$ invention to the 7$^{th}$ invention.

Advantageous Effects of Invention

According to the 1$^{st}$ invention, the c-axis length in the crystal of the lithium-nickel composite oxide is 14.183 angstroms or more, and 14.205 angstroms or less as determined by Rietveld analysis on X-ray diffraction, so as to increase the layer-to-layer distance of the lithium layers and to improve the insertion and de-insertion property of Li from the crystal. Such a lithium-nickel composite oxide can be used as a high-capacity and high-output positive electrode active material. Moreover, if the positive electrode active material has a film containing W and Li on the surface of primary particles, the reaction resistance of the positive electrode active material can be reduced and even higher output characteristics can be obtained.

According to the $2^{nd}$ invention, the positive electrode active material has appropriate porosity which allows an electrolytic solution to sufficiently permeate into the interior of the secondary particles, and can realize even higher battery capacity and output characteristics.

According to the $3^{rd}$ invention, the number of tungsten atoms accounts for 0.1 atom % to 3.0 atom % with respect to the total number of Ni, Co and M atoms contained in the composite oxide particles, so that both high charge and discharge capacity and high output characteristics can be established.

According to the $4^{th}$ invention, the battery capacity and the output characteristics can be improved because of the possession of an appropriate lithium content.

According to the $5^{th}$ invention, lithium tungstate is formed, so that lithium ion conductivity is further increased and an effect of reducing reaction resistance is enhanced.

According to the $6^{th}$ invention, lithium-nickel composite oxide particles have a proper mean particle diameter, so that the positive electrode can have increased packing property while maintaining its battery capacity and output characteristics.

According to the $7^{th}$ invention, the positive electrode active material has a film on the surface of primary particles, and fine particles containing tungsten and lithium and having a diameter ranging from 1 nm to 200 nm, so as to have a sufficient area of contact with an electrolytic solution, and be able to effectively improve lithium ion conduction. Hence, the charge and discharge capacity can be improved as well as the reaction resistance can be more effectively reduced.

According to the $8^{th}$ invention, a high-capacity and highly safe nonaqueous electrolyte secondary battery can be obtained, and the resulting battery is suitable as a secondary battery capable of charging and discharging.

DESCRIPTION OF EMBODIMENTS

Figure 1:
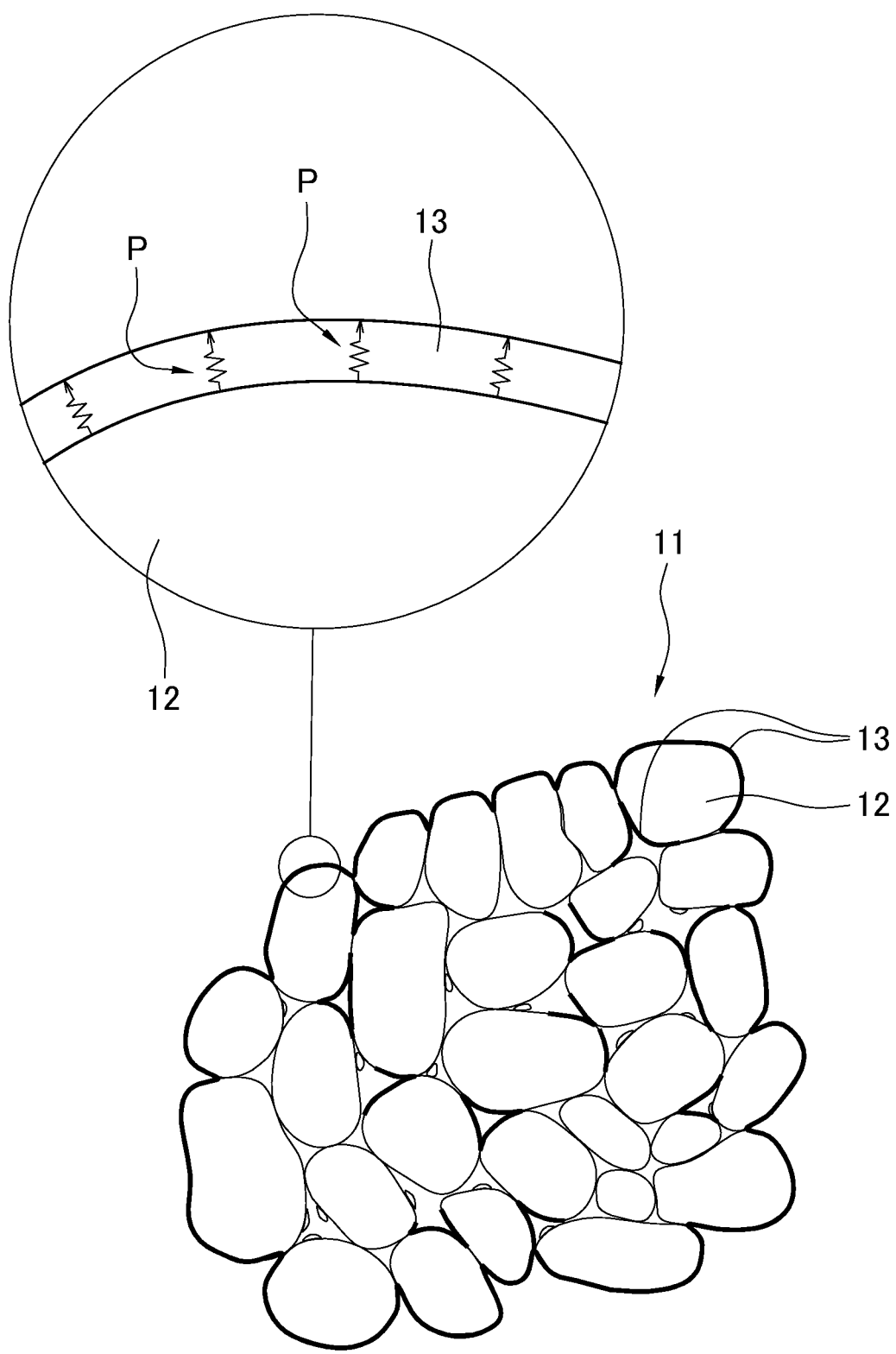
FIG. 1 is an image showing the intercalation of Li ions upon charging in the positive electrode active material according to an embodiment of the present invention.

Hereafter, the present invention will be described. Specifically, first, the positive electrode active material of the present invention will be described, and then the production method therefor and a nonaqueous electrolyte secondary battery in which the positive electrode active material according to the present invention is used will be described.
(1) Positive Electrode Active Material for Nonaqueous Electrolyte Secondary Battery The positive electrode active material for a nonaqueous electrolyte secondary battery of the present invention (hereinafter, simply referred to as positive electrode active material.) is a positive electrode active material comprising primary particles of a lithium-nickel composite oxide represented by the following general formula (1) and secondary particles composed by aggregation of the primary particles, wherein a 1-nm to 200-nm film containing W and Li is present on the surface of the primary particles, and a c-axis length in the crystal of the lithium-nickel composite oxide is 14.183 angstroms or more and 14.205 angstroms or less, as determined by Rietveld analysis on X-ray diffraction.

(Chemical Formula 1)

General formula: $Li_bNi_{1-x-y}Co_xM_yO_2$ (1)

(In the formula, M is at least one type of element selected from Mg, Al, Ca, Ti, V, Cr, Mn, Nb, Zr and Mo, and b is a numerical value satisfying $0.95 \leq b \leq 1.03$, x is a numerical value satisfying $0 < x \leq 0.15$, y is a numerical value satisfying $0 < y \leq 0.07$, and x+y is a numerical value satisfying $x+y \leq 0.16$.)

Here, the lithium-nickel composite oxide is a base material for the formation of fine particles on the surface of the primary particles. Composite oxide particles as described below refer to particles including both primary particles having fine particles on the surface and secondary particles composed by aggregation of the primary particles.
[Composition]

The positive electrode active material of the present invention comprising a lithium-nickel composite oxide that is a hexagonal system layered compound, wherein in the general formula (1), (1−x−y) indicating the nickel (Ni) content is 0.84 or more and less than 1.

In the positive electrode active material of the present invention, the higher the nickel content, the more increased capacity can be achieved when used as a positive electrode active material. However, an excessively high nickel content makes it unable to sufficiently obtain thermostability, and tends to cause cation mixing to take place upon firing. On the other hand, an excessively low nickel content results in lowered capacity, causing a problem such that the capacity per battery volume cannot be obtained sufficiently even when the packing property of a positive electrode is enhanced.

Therefore, the nickel content of the lithium-nickel composite oxide in the positive electrode active material of the present invention is preferably 0.84 or more and 0.98 or less, is more preferably 0.845 or more and 0.950 or less, and is even more preferably 0.85 or more and 0.95 or less.

The value of x denoting a cobalt (Co) content satisfies $0 < x \leq 0.15$, preferably $0.02 \leq x \leq 0.15$, and more preferably $0.03 \leq x \leq 0.13$.

The cobalt content is within the above range, so that excellent cycle property and thermostability can be obtained. The cobalt content is increased, so that the cycle property of the positive electrode active material can be improved. However, the cobalt content exceeding 0.15 makes it difficult to increase the capacity of the positive electrode active material.

The content of at least one type of element M selected from Mg, Al, Ca, Ti, V, Cr, Mn, Nb, Zr and Mo is denoted by y, and y satisfies $0 < y \leq 0.07$, and preferably $0.01 \leq y \leq 0.05$. The M content is within the above range, so that excellent cycle property and thermostability can be obtained.

The value of y exceeding 0.07 makes it difficult to increase the capacity of the positive electrode active material. If no additional element is added, no effect of improving the battery properties can be obtained, and thus y is preferably specified to be 0.01 or more in order to sufficiently obtain an effect of improving the battery properties.

The value of b denoting a lithium (Li) content satisfies $0.95 \leq b \leq 1.03$.

If the value of b is less than 0.95, a metal element such as Ni is mixed into lithium layers in the layered compound, so as to lower the Li's property of insertion and de-insertion. Hence, the battery capacity decreases and the output characteristics become worse. On the other hand, if the value of b exceeds 1.03, Li is mixed into metal layers in the layered compound, so that the battery capacity decreases.

Therefore, the lithium content of the lithium-nickel composite oxide in the positive electrode active material in the present invention satisfies $0.95 \leq b \leq 1.03$, and more preferably $0.95 \leq b \leq 1.01$ in order to achieve good battery capacity and good output characteristics.

[c-Axis Length]

Here, the lithium-nickel composite oxide in the positive electrode active material of the present invention has a very high nickel content that is as high as 0.84 or more, and preferably 0.98 or less.

An increased nickel content results in a problem such as lowered thermostability. In general, a nickel content is adjusted to be less than 0.84, and is generally adjusted to be about 0.80 to 0.83.

However, through appropriate control of the c-axis length of the lithium-nickel composite oxide crystal, as determined by Rietveld analysis on X-ray diffraction, the positive electrode active material of the present invention can have a high nickel content.

Specifically, the positive electrode active material of the present invention can have a high nickel content by specifying the c-axis length determined by subjecting the crystal to Rietveld analysis on X-ray diffraction (hereinafter, simply referred to as c-axis length) to be 14.183 angstroms or more and preferably 14.185 angstroms or more.

Moreover, in the case of a hexagonal system lithium-nickel composite oxide such as the positive electrode active material of the present invention, the c-axis length has an effect on the lithium (Li)'s property of insertion and de-insertion from the crystal.

In general, the longer the c-axis length, the more increased layer-to-layer distance of lithium layers. Hence, when Li's property of insertion and de-insertion from crystal is improved, and such a lithium-nickel composite oxide is used as a positive electrode active material, the resulting positive electrode active material has high capacity and high output.

On the other hand, the shorter the c-axis length, the lower the Li's property of insertion and de-insertion from crystal. When the lithium-nickel composite oxide is used as a positive electrode active material, the capacity decreases and the output also decreases. In addition, cation mixing causes a decrease in crystallinity, causing deterioration in cycle property and thermostability.

For example, when the c-axis length is less than 14.183 angstroms, Li's property of insertion and de-insertion from crystal is lowered, causing decreases in battery capacity and output characteristics.

The positive electrode active material of the present invention has a c-axis length of 14.183 angstroms or more, and thus is a high-capacity and high-output positive electrode active material excellent in Li's property of insertion and de-insertion from crystal.

Specifically, the positive electrode active material of the present invention has a c-axis length of 14.183 angstroms or more, thereby achieving increased capacity as the nickel content increases, as well as realizing increased capacity and increased output as a result of increasing the c-axis length.

The upper limit of the c-axis length is not particularly limited, and the upper limit is about 14.205 angstroms. In the positive electrode active material of the present invention, the c-axis length is preferably 14.183 angstroms or more and 14.205 angstroms or less.

The c-axis length specified to be 14.185 angstroms or more and 14.200 angstroms or less is more preferable since the resulting more enhanced crystallinity results in the higher capacity and improved thermostability.

[Film Containing W and Li]

In general, if the surface of a positive electrode active material is completely coated with different types of compounds, the intercalation of lithium ions is significantly limited. As a result, an advantage of a lithium-nickel composite oxide, high capacity, is cancelled.

FIG. 1 is an image showing the intercalation of Li ions at the time of charging of the positive electrode active material according to an embodiment of the present invention. In the present invention, the surface of primary particles 12 of a lithium-nickel composite oxide contains tungsten (W) and lithium (Li), forming a film 13 having a thickness ranging from 1 nm to 200 nm, and preferably ranging from 1 nm to 150 nm, and more preferably ranging from 2 nm to 100 nm. The film 13 has high lithium ion conductivity, and thus has an effect of accelerating the intercalation of lithium ions. Accordingly, the fine particles are formed on the surface of the primary particles to form Li conduction paths Pin the boundaries with an electrolytic solution and to reduce the reaction resistance (hereinafter, also referred to as "positive electrode resistance") of the positive electrode active material, thereby improving output characteristics.

Specifically, a reduction in positive electrode resistance reduces voltage loss within the battery, and voltage to be actually applied to the load side becomes relatively high, so that high output can be obtained. Moreover, increased voltage is applied to the load side, so that lithium insertion and de-insertion are sufficiently performed at the positive electrode and thus the battery capacity is also improved. Furthermore, a reduction in positive electrode resistance reduces the load on the active material upon charge and discharge, so that the cycle property can also be improved.

Here, when the surface of the composite oxide primary particles 12 is coated excessively thick with a compound containing W and Li, the specific surface area decreases. Accordingly, even if the compound has high lithium ion conductivity, the area of contact with an electrolytic solution decreases, and thus a decrease in charge and discharge capacity and an increase in reaction resistance tend to take place. Moreover, the presence of the compound causes a decrease in reaction resistance. The compound itself has low electron conduction, lowering the electron conductivity of the electrode and lowering the output characteristics.

However, a coating of the compound is formed to have a film thickness within the range as specified according to the present invention, so that lithium ion conduction can be effectively improved without forming an excessively small electrode surface or significantly increasing the bulk resistance of the electrode. Hence, the charge and discharge capacity can be suppressed from lowering and the reaction resistance can be reduced.

Such film 13 has a film thickness ranging from 1 nm to 200 nm. The film having a film thickness of less than 1 nm has no sufficient lithium ion conductivity. In addition, the film thickness exceeding 200 nm causes a reduction in reaction area and an increase in the bulk resistance of the electrode and thus an effect of reducing reaction resistance cannot be sufficiently obtained.

Furthermore, since contact with an electrolytic solution takes place on the surface of the primary particles 12, it is important that the above film 13 is formed on the surface of the primary particles 12.

Here, the surface of the primary particles in the present invention includes the surface of the primary particles 12, which is exposed on the outer face of the secondary particles 11, the areas in the vicinity of the surface of the secondary particles 11, into which an electrolytic solution can permeate via the outer face of the secondary particles 11, and the surface of the primary particles 12 exposed to internal voids. Furthermore, even the grain boundaries among the primary particles 12 are included herein, as long as the primary particles 12 are incompletely bound so that an electrolytic solution can permeate thereinto.

Therefore, the above film is formed on all over the surface of the primary particles 12 to further accelerate the intercalation of lithium ions, making it possible to further lower the reaction resistance of composite oxide particles. It is not required to form the film 13 on all the surfaces of the primary particles 12, which can come into contact with an electrolytic solution. However, the higher the proportion of coating, the more easily obtained the effect of lowering reaction resistance.

Furthermore, when the above compound is formed on the surface of the primary particles 12 under conditions where the film 13 and fine particles are present in a mixed state, a high effect on battery properties can be obtained.

To obtain an even higher effect of improving battery properties, a compound in the form of fine particles is preferably present as fine particles having a particle diameter ranging from 1 nm to 200 nm on the surface of the primary particles of a lithium metal composite oxide.

Employment of such a form establishes a sufficient area of contact with an electrolytic solution, and can effectively improve lithium ion conduction, so that charge and discharge capacity can be improved and reaction resistance can be lowered more effectively. With the particle diameter of less than 1 nm, the fine particles may not have sufficient lithium ion conductivity.

However, the particle diameter exceeding 200 nm results in uneven formation of fine particles on the surface of primary particles, and thus a higher effect of lowering reaction resistance may not be obtained.

However, not all particles existing in the form of fine particles are required to exist as fine particles having a particle diameter ranging from 1 nm to 200 nm. A higher effect of improving battery properties can be obtained by interaction with the coating mode of the thin film as long as preferably 50% or more of the number of fine particles having a particle diameter ranging from 1 nm to 200 nm is formed on the surface of primary particles.

The surface properties of such primary particles can be determined by cross-sectional observation under a field-emission type scanning electron microscope, cross-sectional element mapping by EDX analysis using scanning transmission electron microscopy (STEM), or cross-sectional observation under a transmission field-ionization microscope, for example. It was confirmed for the positive electrode active material for a nonaqueous electrolyte secondary battery of the present invention that a film containing W and Li is formed on the surface of primary particles comprising a lithium-nickel composite oxide.

On the other hand, when the above compound is formed unevenly among lithium-nickel composite oxide particles, lithium ions are intercalated unevenly among particles, and a load is added onto specific composite oxide particles. Such a situation easily worsens cycle property and increases reaction resistance. Therefore, the above compound is preferably formed uniformly even among lithium-nickel composite oxide particles.

In the present invention, the compound may be a compound containing W and Li, in which W and Li are preferably in the form of lithium tungstate. The form is preferably at least one type of form selected from $Li_2WO_4$, $Li_4WO_5$, $Li_6WO_6$, $Li_2W_4O_{13}$, $Li_2W_2O_7$, $Li_6W_2O_9$, $Li_2W_2O_7$, $Li_2W_5O_{16}$, $Li_9W_{19}O_{55}$, $Li_3W_{10}O_{30}$, $Li_{18}W_5O_{15}$ or hydrates thereof. Through the formation of the lithium tungstate, lithium ion conductivity is more increased and an effect of lowering reaction resistance becomes more significant.

The number of tungsten atoms contained in the compound is specified to account for preferably 0.1 atom % to 3.0 atom %, more preferably 0.1 atom % to 1.0 atom %, and further preferably 0.1 atom % to 0.6 atom % with respect to the total number of Ni, Co and M atoms contained in composite oxide particles. This can establish both high charge and discharge capacity and high output characteristics.

If an amount of tungsten is less than 0.1 atom %, the above compound is formed insufficiently, so that an effect of improving output characteristics may not be obtained sufficiently. If an amount of tungsten exceeds 3.0 atom %, an excessively thick coating film is formed, so that a specific surface area decreases and the bulk resistance of the electrode increases. In such a case, a sufficient effect of lowering reaction resistance may not be obtained.

Furthermore, the amount of lithium contained in the above compound is not particularly limited, an effect of improving lithium ion conductivity can be obtained as long as lithium is contained and the above compound is formed. The amount of lithium is preferably an amount sufficient for the formation of lithium tungstate.

When the amount of tungsten is specified to be 0.1 atom % to 3.0 atom %, the resulting positive electrode active material is preferably represented by the following general formula (2).

(Chemical Formula 2)

General formula: $Li_bNi_{1-x-y}Co_xM_yW_zO_{2+\alpha}$ (2)

(In the formula, M is at least one type of element selected from Mg, Al, Ca, Ti, V, Cr, Mn, Nb, Zr and Mo, b is a numerical value satisfying $0.95 < b \leq 1.10$, x is a numerical value satisfying $0 < x \leq 0.15$, y is a numerical value satisfying $0 < y \leq 0.07$, x+y is a numerical value satisfying $x+y \leq 0.16$, z is a numerical value satisfying $0.001 \leq z \leq 0.03$, and $\alpha$ is a numerical value satisfying $0 \leq \alpha \leq 0.2$.)

The value of b indicating a lithium (Li) content satisfies $0.95 \leq b \leq 1.10$. If the value of b exceeds 1.10, lithium is consumed by the above compound formed on the surface of primary particles, but the lithium content in the lithium-nickel composite oxide is increased excessively, and Li may be mixed into a metal layer of the layered compound. On the other hand, if the value of b is 0.95 or less, lithium is consumed by the above compound and thus a metal element such as Ni may tend to mix into a lithium layer in the layered compound. Therefore, in order to improve battery capacity and output characteristics, $0.95 < b \leq 1.08$ is more preferable. The value of z indicating a tungsten (W) content more preferably satisfies $0.001 \leq z \leq 0.01$.

[Mean Particle Diameter]

The positive electrode active material of the present invention comprising the above-described lithium-nickel composite oxide particles, and the composite oxide particles have a mean particle diameter ranging from preferably 5 μm to 30 μm, more preferably 5 μm to 25 μm, and further preferably 8 μm to 20 μm.

When the mean particle diameter is less than 5 μm, the packing property in the positive electrode is lowered when the material is used as a positive electrode active material for a battery, and the battery capacity per volume may decrease. On the other hand, when the mean particle diameter exceeds 30 μm, the area of contact between the positive electrode active material and an electrolytic solution of the battery is decreased, and thus the battery capacity and the output characteristics can be lowered.

Therefore, in the positive electrode active material of the present invention, the mean particle diameter of the above composite oxide particles is specified to be preferably 8 μm to 20 μm, and particularly preferably 8 μm to 17 μm, in order to further increase the packing property of the positive electrode while keeping the battery capacity and the output characteristics.

The positive electrode active material of the present invention comprising primary particles, and secondary particles composed by aggregation of the primary particles. Through employment of such particle structure, contact with the above electrolytic solution takes place at not only the outer face of the secondary particles composed by aggregation of the primary particles, but also areas in the vicinity of the surface and the internal voids, as well as the incomplete grain boundaries of the secondary particles.

To achieve such contact with an electrolytic solution, the mean particle diameter of the composite oxide particles according to the present invention is preferably within the above range. Within the mean particle diameter range, both contact with an electrolytic solution and packing property can be established in excellent conditions.

Further, the specific surface area of the positive electrode active material preferably ranges from 0.4 to 1.2 m²/g, and more preferably ranges from 0.4 to 1.0 m²/g as measured by the BET method.

With such a specific surface area, contact with an electrolytic solution takes place within a proper range, and thus the battery capacity and the output characteristics can further be enhanced. However, the specific surface area of less than 0.4 m²/g results in an excessively small area of contact with an electrolytic solution, and the specific surface area exceeding 1.2 m²/g results in an excessively large area of contact with an electrolytic solution, which can lower the thermostability.

A porosity determined by cross-sectional observation of the above secondary particles in the present invention; that is, a porosity of the void parts including tungsten- and lithium-containing fine particles preferably ranges from 0.5% to 4.0%, and more preferably ranges from 0.7% to 3.5%.

As described above, a porosity as used herein is calculated considering that tungsten- and lithium-containing fine particles existing in voids are included in the void parts. In other words, the void parts are portions where the lithium-nickel composite oxide represented by general formula (1) is absent in the cross section of the above secondary particles.

Employment of the above porosity allows an electrolytic solution to sufficiently permeate into the interior of the secondary particles, so that the battery capacity and the output characteristics can further be enhanced. Meanwhile, a porosity exceeding 4.0% can result in insufficient crystallinity and increased reaction resistance.

Here, a porosity can be measured by observing an arbitrary cross section of the above secondary particles with the use of a scanning electron microscope, followed by image analysis.

For example, a plurality of secondary particles are embedded in a resin or the like, cross section polisher processing or the like is performed to enable the cross-sectional observation of particles, void parts within arbitrary 20 or more secondary particles are set to be black and dense parts within the contour of the same are set to be white using image analysis software (e.g, WinRoof 6.1.1), the total area of all the particles is measured, and then the area ratio [black parts/(black parts+white parts)] is calculated, so that porosity can be found.

(2) Method for Producing Positive Electrode Active Material

Hereinafter, a method for producing the positive electrode active material for a nonaqueous electrolyte secondary battery of the present invention is described for each step in detail.

A method for producing a positive electrode active material comprises the following steps (A) to (D).

(A) Firing Step

The firing step comprises firing a lithium mixture prepared by mixing a nickel compound and a lithium compound under an oxidizing atmosphere such as an oxygen atmosphere within a temperature range of 700° C. to 780° C., and preparing fired lithium-nickel composite oxide powder represented by the following general formula (3) and comprising primary particles and secondary particles composed by aggregation of the primary particles.

(Chemical Formula 3)

General formula: $Li_aNi_{1-x-y}Co_xM_yO_2$ (3)

(In the formula, M is at least one type of element selected from Mg, Al, Ca, Ti, V, Cr, Mn, Nb, Zr and Mo, and a is a numerical value satisfying $0.98 \leq a \leq 1.11$, x is a numerical value satisfying $0 < x \leq 0.15$, y is a numerical value satisfying $0 < y \leq 0.07$, and x+y is a numerical value satisfying $x+y \leq 0.16$.)

[Nickel Compound]

The nickel compound to be used in the firing step is a compound containing nickel and cobalt, and containing as an additional element M, at least one type of element selected from Mg, Al, Ca, Ti, V, Cr, Mn, Nb, Zr and Mo.

As a nickel compound, for example, any one of a nickel composite hydroxide, a nickel oxy composite hydroxide obtained by oxidization of the above nickel composite hydroxide using an oxidizing agent, a nickel composite oxide obtained by oxidation roasting of the above nickel oxy composite hydroxide at temperatures ranging from 500° C. to 750° C., a nickel composite oxide obtained by oxidation roasting of the above nickel composite hydroxide at temperatures ranging from 500° C. to 750° C., and a nickel composite oxide obtained by oxidation roasting of a mixture of the above nickel composite hydroxide and the above nickel oxy composite hydroxide at temperatures ranging from 500° C. to 750° C. can be used as a nickel compound serving as a raw material in the firing step.

The nickel composite hydroxide to be used as a nickel compound is not particularly limited. For example, a nickel composite hydroxide obtained by a crystallization method such as coprecipitation and homogeneous precipitation can be used.

Through the use of a crystallization method, a nickel composite hydroxide can be obtained under various conditions, the crystallization conditions are not particularly limited, and a nickel composite hydroxide is preferably obtained under the following conditions.

Specifically, a nickel composite hydroxide is preferably obtained by adding dropwise an aqueous solution of a metal compound containing nickel and cobalt and containing, as an additional element M, at least one type of element selected from Mg, Al, Ca, Ti, V, Cr, Mn, Nb, Zr and Mo, and an aqueous solution containing an ammonium ion donor into a reactor heated at 40° C. to 60° C.

A nickel composite hydroxide is preferably prepared by adding dropwise an aqueous solution of an alkali metal hydroxide as necessary so that the reaction solution can maintain its alkalinity; that is, its pH at 10 to 14 based on preferably the solution temperature of 25° C.

In addition, the additional element M may be co-precipitated with nickel and cobalt, or, a hydroxide is obtained by crystallization and then coating is performed with a metal compound containing the additional element M, or, impregnation is performed with an aqueous solution containing the metal compound, so that a nickel composite hydroxide can also be obtained.

The nickel composite hydroxide obtained by the above crystallization method is powder having high bulk density.

Furthermore, the composite hydroxide having such high bulk density facilitates the obtainment of lithium-nickel composite oxide particles having a small specific surface area after water washing treatment following the firing step, so that the nickel composite hydroxide is suitable as a raw material for a lithium-nickel composite oxide to be used as a positive electrode active material for a nonaqueous electrolyte secondary battery.

If a nickel hydroxide is crystallized under conditions where the temperature of a reaction solution exceeds 60° C. or the pH thereof exceeds 14, the priority of nucleation increases in the solution and no crystal growth proceeds and only fine powder may be obtained. On the other hand, when a nickel composite hydroxide is crystallized under conditions where the temperature is lower than 40° C. or the pH is less than 10, nucleation takes place at a low level in the solution and the crystal growth of particles preferentially proceeds, and coarse particles may be mixed into the obtained nickel composite hydroxide. Also, the residual amount of metal ions in the reaction solution may increase and compositional deviation may take place.

A nickel composite hydroxide containing such coarse particles mixed therein and undergoing compositional deviation is used as a raw material, the resulting positive electrode active material has lowered battery properties.

Therefore, when a nickel composite hydroxide to be used as a nickel compound in the firing step is obtained by a crystallization method, crystallization is preferably performed under conditions where a reaction solution is maintained at 40° C. to 60° C. and the pH of the reaction solution is maintained at 10 to 14 based on the solution temperature of 25° C.

In the firing step, a nickel oxy composite hydroxide can be used as a nickel compound. A method for obtaining a nickel oxyhydroxide is not particularly limited. A nickel oxyhydroxide is preferably prepared by oxidizing a nickel composite hydroxide using an oxidizing agent such as sodium hypochlorite, or hydrogen peroxide water. A nickel oxy composite hydroxide obtained by the method is powder having high bulk density.

The nickel oxy composite hydroxide having such high bulk density facilitates the obtainment of lithium-nickel composite oxide particles having a small specific surface area after water washing treatment following the firing step, so that the resulting nickel oxy composite hydroxide is suitable as a raw material for a lithium-nickel composite oxide to be used as a positive electrode active material for a nonaqueous electrolyte secondary battery.

Moreover, in the firing step, a nickel composite oxide can also be used as a nickel compound.

A method for obtaining a nickel composite oxide is not particularly limited, and a nickel composite oxide is preferably obtained by performing oxidation roasting of the above nickel composite hydroxide or nickel oxy composite hydroxide under an oxidizing atmosphere at temperatures ranging from 500° C. to 750° C., and more preferably ranging from 550° C. to 700° C.

The use of the thus obtained nickel composite oxide makes it possible to stabilize the composition ratio of Li and metal elements other than Li in a lithium-nickel composite oxide, when the lithium-nickel composite oxide is obtained by firing a mixture obtained by mixing with a lithium compound. In this manner, an advantage can be obtained such that capacity and output can be increased when the lithium-nickel composite oxide is used as a positive electrode active material.

Here, when oxidation roasting of a nickel composite hydroxide or a nickel oxy composite hydroxide is performed at a temperature for oxidation roasting of lower than 500° C., conversion to an oxide such as a nickel composite hydroxide may be incompletely carried out.

In the case of a lithium-nickel composite oxide obtained using a nickel composite oxide resulting from incomplete conversion to an oxide, the composition is stabilized with difficulty so as to often cause uneven composition during firing.

Furthermore, if a nickel composite hydroxide and the like remain in the nickel composite oxide after oxidation roasting, problems can occur such that water vapor is generated during firing to inhibit the reaction of a lithium compound with a nickel composite oxide, and the crystallinity is lowered.

Meanwhile, when the temperature for oxidation roasting exceeds 750° C., the crystallinity of the thus obtained nickel composite oxide increases, and the reactivity between a lithium compound and a nickel composite oxide during firing of the post-step is lowered. Hence, crystallinity of the finally obtained lithium-nickel composite oxide decreases and thus the c-axis length may not be 14.183 angstroms or more.

Moreover, the nickel composite oxide rapidly undergoes grain growth, coarse nickel composite oxide particles are formed, and thus the mean particle diameter of a lithium-nickel composite oxide obtained by mixing and firing a lithium compound may be excessively increased.

Therefore, when a nickel composite oxide is obtained by performing oxidation roasting of a nickel composite hydroxide or a nickel oxy composite hydroxide under an oxidizing atmosphere, oxidation roasting is performed at temperatures ranging from preferably 500° C. to 750° C., and more preferably 550° C. to 700° C.

The retention time of the temperature for oxidation roasting ranges from preferably 1 to 10 hours, and more preferably 2 to 6 hours. The retention time of less than 1 hour may result in incomplete conversion to an oxide, and the retention time exceeding 10 hours may result in excessively high crystallinity of the nickel composite oxide.

An atmosphere for oxidation roasting may be an oxidizing atmosphere, and is preferably specified to be an air atmosphere in view of handleability and cost.

A nickel composite hydroxide to be used as a nickel compound has a sulfate radical ($SO_4$) content ranging from preferably 0.1 to 0.4 mass %, and more preferably 0.1 to 0.3 mass %. This enables easy control of the crystallinity of the lithium-nickel composite oxide during firing of the post-step.

Specifically, the sulfate radical content is specified to be 0.1 mass % to 0.4 mass %, so that the c-axis length can be easily controlled. Furthermore, contraction of secondary particles due to the growth of primary particles during firing can be kept at an appropriate level, so that a porosity can also be easily controlled.

However, the sulfate radical content of less than 0.1 mass % causes excessively rapid crystallization, and 14.183 angstroms or more cannot be always achieved. Furthermore, primary particles grow and secondary particles significantly contract, and thus the specific surface area and a porosity decrease excessively. On the other hand, the sulfate radical content exceeding 0.4 mass % suppresses the growth of primary particles, so that the specific surface area and a porosity increase excessively.

Moreover, a nickel oxy composite hydroxide obtained from the nickel composite hydroxide and a nickel composite oxide contain sulfate radical in an amount almost the same as that of sulfate radical contained in the nickel composite hydroxide.

Therefore, the sulfate radical ($SO_4$) content of the nickel composite hydroxide is specified to be 0.1 to 0.4 mass %, so that a similar effect can also be obtained when an active material is obtained using a nickel oxy composite hydroxide obtained from a nickel composite hydroxide, or a nickel composite oxide as a raw material.

The above nickel composite hydroxide is preferably obtained by a crystallization method, and at this time a nickel composite hydroxide having the sulfate radical content ranging from 0.1 mass % to 0.4 mass % is preferably obtained using sulfate such as nickel sulfate as a raw material, and then sufficiently washing the resultant after crystallization.

Furthermore, washing is preferably performed using an aqueous alkaline solution with a pH adjusted to be 11 to 13 based on the solution temperature of 25° C. If the pH of the aqueous alkaline solution is less than 11, the sulfate radical content may not be decreased to 0.1 to 0.4 mass %. Even if the pH of an aqueous alkaline solution exceeds 13, an effect of reducing the level of sulfate radical is not improved and cations in the aqueous alkaline solution may remain as impurities.

As an aqueous alkaline solution, an aqueous solution of an alkali metal hydroxide such as sodium hydroxide, an aqueous solution of a carbonate such as sodium carbonate or the like is preferably used. Water washing is preferably performed after washing with an aqueous alkaline solution.

[Mixing with Lithium Compound]

A lithium compound to be mixed with a nickel compound is not particularly limited, and at least one type of compound selected from the group comprising lithium hydroxide, oxyhydroxide, oxide, carbonate, nitrate and halogenide is preferably used.

When such a lithium compound is used, an advantage is obtained such that no impurity remains after firing. The use of a lithium hydroxide having good reactivity with a nickel compound is more preferable.

The mixed ratio of a nickel compound and a lithium compound is not particularly limited, but the composition of lithium and metal elements other than lithium in the lithium-nickel composite oxide after firing is almost maintained at the composition of a mixture obtained by mixing the nickel compound and the lithium compound.

Therefore, the amount of lithium in a lithium compound is preferably adjusted to 0.98 to 1.11 in molar ratio with respect to the total amount of nickel and other metal elements in the nickel compound.

When the above molar ratio is less than 0.98, the crystallinity of the thus obtained fired powder may become significantly worse. Also, the lithium content in the obtained fired powder may be less than 0.98.

On the other hand, the molar ratio of exceeding 1.11 facilitates firing to easily cause excess burning, and can cause the lithium content of the obtained fired powder to exceed 1.11.

An apparatus and a method for mixing a nickel compound and a lithium compound is not particularly limited, as long as they can uniformly mix the two. For example, a dry blender such as a V blender or a mixing and granulating apparatus can be used, for example.

[Firing]

A lithium mixture prepared by mixing a nickel compound and a lithium compound is fired under an oxidizing atmosphere at temperatures ranging from 700° C. to 780° C., and preferably ranging from 730° C. to 760° C.

When the mixture is fired at a temperature higher than 500° C., a lithium-nickel composite oxide is generated, however, when the mixture is fired at a temperature lower than 700° C., crystal development is incomplete and the crystal is structurally unstable. When such a lithium-nickel composite oxide is used as a positive electrode active material, the crystal structure of the positive electrode active material is easily deformed by phase transition or the like due to charge and discharge. Moreover, primary particles grow insufficiently, so that the specific surface area or a porosity may excessively increase.

On the other hand, when the mixture is fired at a temperature higher than 780° C., cation mixing is likely to occur. Furthermore, the layer structure within the crystal of the lithium-nickel composite oxide is deformed, which can make the insertion and de-insertion of lithium ions difficult. Furthermore, the c-axis length of 14.183 angstroms or more cannot be obtained.

Furthermore, the crystal of the lithium-nickel composite oxide is resolved, and a nickel oxide and the like may be generated. Moreover, composite oxide particles are sintered, and coarse composite oxide particles are formed, so that the lithium-nickel composite oxide may have an excessively large mean particle diameter. Furthermore, primary particles grow, and then the specific surface area and a porosity may excessively decrease.

Therefore, the lithium mixture is fired at firing temperatures ranging from 700° C. to 780° C., and preferably ranging from 730° C. to 760° C., so that the c-axis length obtained by Rietveld analysis on X-ray diffraction is 14.183 angstroms or more.

Furthermore, the retention time at firing temperatures is specified to be preferably 1 to 6 hours, and more preferably 2 to 4 hours. The retention time of less than 1 hour results in insufficient crystallization and may not result in the c-axis length of 14.183 angstroms or more. The retention time exceeding 6 hours results in excessive firing, which may cause cation mixing.

In particular, firing is particularly preferably performed in two stages including 1 to 5 hours of firing at temperatures ranging from 400° C. to 600° C., followed by 3 or more hours of firing at temperatures ranging from 700° C. to 780° C., so as to be able to remove water of crystallization and the like in a lithium compound, and to perform homogeneous reaction within a temperature range where the crystal growth of the lithium-nickel composite oxide proceeds.

The firing enables synthesis of a lithium-nickel composite oxide if under an oxidizing atmosphere. The oxidizing atmosphere is preferably specified to be a mixed gas atmosphere of 18 to 100 capacity % oxygen and an inert gas, and is more preferably specified to be a mixed gas atmosphere in which oxygen concentration is 90 capacity % or more.

When firing is performed under an atmosphere where the oxygen concentration is 18 capacity % or more, that is, the oxygen content is higher than that in an air atmosphere, reactivity between a lithium compound and a nickel compound can be increased.

To further increase the reactivity and to obtain a lithium-nickel composite oxide excellent in crystallinity, a mixed gas atmosphere in which the oxygen concentration is 90 capacity % or more is more preferable and an oxygen atmosphere (oxygen concentration of 100%) is further more preferable.

An apparatus and a method for firing a lithium mixture are not particularly limited. For example, a firing furnace such as an electric furnace, a kiln, a tube furnace, or a pusher furnace can be used. In these apparatus a gas atmosphere can be adjusted to have an oxygen concentration of 18 capacity % or more, such as an oxygen atmosphere, or a dry air atmosphere subjected to dehumidification and decarbonation.

As described above, the fired powder of the lithium-nickel composite oxide represented by the following formula (4), having the c-axis length of 14.183 angstroms or more as determined by Rietveld analysis on X-ray diffraction, and comprising primary particles and secondary particles composed by aggregation of the primary particles is prepared.

When a positive electrode active material obtained from the fired product is used for a positive electrode of a battery, thermostability and the like can be maintained and the insertion and de-insertion of lithium ions are facilitated, so that increased capacity and increased output can be realized.

(Chemical Formula 4)

$$\text{General formula: } Li_aNi_{1-x-y}Co_xM_yO_2 \quad (4)$$

(In the formula, M is at least one type of element selected from Mg, Al, Ca, Ti, V, Cr, Mn, Nb, Zr and Mo, and a is a numerical value satisfying $0.98 \leq a \leq 1.11$, x is a numerical value satisfying $0 < x \leq 0.15$, y is a numerical value satisfying $0 < y \leq 0.07$, and x+y is a numerical value satisfying $x+y \leq 0.16$.)

Here, if "a" indicating the lithium content of fired powder is less than 0.98, the crystallinity of the fired powder decreases and, in the lithium-nickel composite oxide after the water washing step, the resulting molar ratio of lithium to metal elements other than lithium is less than 0.95. This causes a significant decrease in battery capacity during the charge and discharge cycle.

On the other hand, if the value of "a" exceeds 1.11, a large amount of the lithium compound is present excessively on the surface of fired powder, and the removal thereof by water washing becomes difficult. The use of a positive electrode active material from which an excessive amount of the lithium compound has been removed insufficiently causes the generation of a large amount of gas at the time of battery charge. Moreover, the powder exhibiting high pH reacts with materials such as an organic solvent to be used for electrode preparation, so as to cause slurry gelation, which may lead to a malfunction.

Furthermore, if the value of "a" exceeds 1.11, a lithium content of the lithium-nickel composite oxide in the positive electrode active material exceeds 1.03. In this case, when the thus obtained positive electrode active material is used as a positive electrode active material for a battery, the battery capacity decreases and the internal resistance of the positive electrode increases.

As a method for obtaining fired lithium-nickel composite oxide powder, a case of mixing and firing a nickel compound that have been subjected to solution treatment or dispersion of metal elements other than lithium through a crystallization method, and a lithium compound as raw materials is described.

However, the above method for obtaining fired powder is not particularly limited. Examples thereof include a method that involves performing spray pyrolysis for a solution prepared by mixing all aqueous solutions containing desired metal elements, and a method that involves milling and mixing all compounds of desired metal elements by mechanical milling using such as a ball mill, followed by firing. However, to obtain a positive electrode active material having a small specific surface area and good thermostability, fired lithium-nickel composite oxide powder is preferably obtained by the above methods.

(B) Water Washing Step

A water washing step is a step for water washing the fired lithium-nickel composite oxide powder obtained in the firing step.

Specifically, a slurry is formed so that fired powder ranges from 700 g to 2000 g with respect to 1 L of water, the slurry is subjected to water washing, filtered, and then dried to obtain lithium-nickel composite oxide powder (water-washed powder).

In the water washing step, the water-washing temperature during water washing is adjusted to be preferably 10° to 40° C., and more preferably 10° C. to 30° C.

Through such adjustment of the temperature, impurities existing on the surface of fired lithium-nickel composite oxide powder are removed, and the amount of residual lithium existing on the surface, such as lithium carbonate and lithium hydroxide is kept at 0.10 mass % or less with respect to the total amount of the powder.

Therefore, when the thus obtained positive electrode active material is used for a positive electrode of a battery, gas generation when a high temperature is maintained can be suppressed and high capacity, high output and high safety can be exhibited at the same time.

By contrast, when the temperature for water washing is lower than 10° C., fired powder cannot be sufficiently washed and impurities adhering to the surface of the fired powder may remain unremoved in large amounts. When impurities remain on the surface of fired powder as described above, resistance on the surface of the thus obtained positive electrode active material increases so that the value of resistance of a positive electrode increases when the material is used for the positive electrode of a battery. Furthermore, the specific surface area of positive electrode active material becomes too small, the reactivity with an electrolytic solution is lowered, and thus increasing of capacity and output cannot be achieved easily when the active material is used for a positive electrode of a battery.

Moreover, the amount of residual lithium existing on the surface of composite oxide particles exceeds 0.10 mass %, resulting in a situation where gas generation upon high temperature storage takes place easily when the material is used as a battery.

On the other hand, when the temperature for water washing exceeds 40° C., the amount of lithium eluted from fired powder increases, nickel oxide (NiO) from which Li has been eliminated and nickel oxyhydroxide (NiOOH) in which Li has been substituted with H may be generated on the surface layer. Both nickel oxide (NiO) and nickel oxyhydroxide (NiOOH) have high electrical resistance, so that as the surface resistance of composite oxide particles increases, Li of the lithium-nickel composite oxide decreases and the capacity is lowered.

In the above water washing, water and fired powder are mixed to form a slurry, and then the slurry is stirred to wash fired powder. At this time, the amount of fired powder (g) is adjusted to be 700 g to 2000 g, and preferably 700 g to 1500 g with respect to 1 L of water contained in the slurry.

Specifically, as the slurry concentration increases, the amount of fired powder in the slurry increases. However, the slurry concentration exceeding 2000 g/L leads to increased slurry viscosity, making stirring difficult. Moreover, an alkali concentration in the slurry solution is increased, so that the dissolution rate of adherents adhering to fired powder decreases because of equilibrium. Furthermore, even if adherents detach from powder, the adherents may adhere again, resulting in difficult removal of impurities.

On the other hand, when the slurry concentration is less than 700 g/L, the solution is excessively dilute, and thus the amount of lithium eluted from the surface of individual particles into the slurry increases. In particular, as the nickel proportion increases, the amount of lithium eluted is high and the amount of lithium on the surface is low. Accordingly, lithium de-insertion from the crystal lattice of a lithium-nickel composite oxide takes place, so that the crystal structure becomes easily deformed.

Therefore, if the thus obtained positive electrode active material is used for a positive electrode of a battery, the battery capacity is lowered.

The time for water washing of fired powder is not particularly limited and preferably specified to be about 5 to 60 minutes. If the time for water washing is short, impurities on the surface of powder are not sufficiently removed and can remain.

On the other hand, even if the time for water washing is set longer, a washing effect is not improved and the productivity decreases.

Water to be used for forming a slurry is not particularly limited, less than 10 μS/cm water is preferred and 1 μS/cm or less water is more preferred as found by electrical conductivity measurement in order to prevent battery performance from decreasing due to adherence of impurities to a positive electrode active material.

Furthermore, a lithium-containing tungsten compound is added to fired powder during water washing treatment or after water washing treatment, and then tungsten is dispersed on the surface of primary particles of the above lithium-nickel composite oxide. The step of dispersing tungsten is described in detail in a tungsten dispersion step described later. When drying is performed after water washing treatment, drying is preferably performed as follows.

Temperatures and methods for drying the fired lithium-nickel composite oxide powder after water washing are not particularly limited, and the temperature for drying ranges from preferably 80° C. to 500° C., and more preferably 120° C. to 250° C. With the temperature for drying set at 80° C. or higher, fired powder after water washing can be dried within a short time period, a lithium concentration gradient can be suppressed from taking place between the surface and the interior of composite oxide particles, and thus battery properties can be more improved.

Meanwhile, a state in the vicinity of the surface of fired powder after water washing is predicted to be extremely close to stoichiometric ratio or state-of-charge (SOC) because of de-insertion of lithium to some degree. Accordingly, a temperature exceeding 500° C. provides a chance of deforming the crystal structure of the powder in a state close to state-of-charge (SOC), which may cause a deterioration in electric characteristics.

Therefore, to reduce concerns in terms of the physical properties and the properties of fired lithium-nickel composite oxide powder after water washing, temperatures ranging from 80° C. to 500° C. are preferred and if productivity and thermal energy cost are also taken into consideration, temperatures ranging from 120° C. to 250° C. are more preferred.

In addition, a method for drying fired lithium-nickel composite oxide powder is preferably performed using a dryer capable of controlling filtered powder under a gas atmosphere or a vacuum atmosphere containing no compound components including carbon and sulfur, at a predetermined temperature.

(C) Step of Adding Tungsten

The step of adding tungsten (W) is a step of adding a tungsten compound to fired powder during water washing treatment or after water washing treatment, and dispersing W on the surface of primary particles while controlling the moisture percentage of the fired powder at 6.5 to 11.5 mass %.

Specifically, W can be added to a slurry during water washing treatment, to fired powder before drying but after water washing treatment, or to fired powder dried after water washing treatment. Through the control of the moisture percentage, W dispersion uniformity is enhanced and Li elution is suppressed, so that a film containing W and Li, or the film and fine particles can be formed on the surface of primary particles of the positive electrode active material.

The amount of tungsten to be dispersed on the surface of primary particles of fired powder ranges from preferably 0.1 atom % to 3.0 atom %, and more preferably 0.1 atom % to 1.0 atom % with respect to the total amount of the number of the atoms of Ni, Co and M contained in the fired powder. In this manner, a film containing W and Li, or the film and fine particles are more uniformly formed on the surface of primary particles of the positive electrode active material, so that Li conduction paths are formed in the boundaries with an electrolytic solution when the material is used for a positive electrode of a battery, so as to make it possible to lower the reaction resistance of the active material and to further improve the output characteristics.

(C-1) Addition to Slurry During Water Washing Treatment

When W is added to a slurry during water washing treatment, W may be added in the form of an alkaline solution containing a tungsten compound dissolved therein (hereinafter, an alkaline solution containing a tungsten compound dissolved therein is referred to as an alkaline solution (W).), or the form of a tungsten compound.

When W is added in the form of an alkaline solution (W), a tungsten compound may be any tungsten compound as long as it can be dissolved in an alkaline solution. Preferably, a tungsten compound readily soluble to alkali, such as tungsten oxide, lithium tungstate, or ammonium tungstate is used.

As alkali to be used for the alkaline solution (W), a general alkaline solution containing no impurities harmful to positive electrode active materials is used in order to obtain high charge and discharge capacity.

Ammonia or lithium hydroxide with no concern of contamination with impurities can be used, and lithium hydroxide is preferably used in view of its nature of causing no inhibition to lithium (Li) intercalation.

Li is eluted from fired lithium-nickel composite oxide powder and then supplied. When lithium hydroxide is used for the alkaline solution (W), pH at which a tungsten compound is dissolved may be employed, and Li in an amount sufficient for the formation of a compound containing W and Li can be supplied through the use of lithium hydroxide for the alkaline solution (W). In addition, when pH is adjusted using lithium hydroxide, ammonia or the like can be supplementarily used.

On the other hand, when W is added in the form of a tungsten compound, the tungsten compound is preferably a tungsten compound soluble to alkali, more preferably a lithium-containing tungsten compound, further preferably lithium tungstate, and particularly preferably at least one type selected from $Li_2WO_4$, $Li_4WO_5$, and $Li_6W_2O_9$.

A slurry upon water washing will be alkaline due to Li eluted from fired lithium-nickel composite oxide powder, so that a tungsten compound soluble to alkali is dispersed in the form of fine particles in the slurry without being completely dissolved and then adheres to the outer face of secondary particles of the lithium-nickel composite oxide. In addition, the tungsten compound dissolved in the slurry partially permeate into the interior of the secondary particles, so as to be able to disperse W on the surface of primary particles.

After addition of W to the slurry, the slurry was sufficiently stirred so that tungsten permeates into the interior of the secondary particles, and then solid-liquid separation is performed to achieve the above moisture percentage range.

The amount of tungsten contained in water remaining after solid-liquid separation is the amount of tungsten to be dispersed on the surface of primary particles. The volume of remaining water is found in advance by a preliminary test or the like, and then the amount of tungsten to be added to a slurry may be adjusted.

(C-2) Addition to Fired Powder Before Drying but after Water Washing Treatment

W can be added to fired powder before drying but after water washing treatment. In this case, W can be added in the form of the alkaline solution (W) or a tungsten compound, which is used for the above addition to a slurry during water washing treatment.

When W is added in the form of an alkaline solution (W), its pH is preferably adjusted to 9 to 12 based on the solution temperature of 25° C.

When the pH is less than 9, the amount of lithium eluted from fired powder increases excessively and the battery properties may deteriorate. When the pH exceeds 12, the amount of excessive alkali remaining in the above composite oxide particles increases excessively, and thus the battery properties may deteriorate.

Moreover, the tungsten concentration of an alkaline solution (W) ranges from preferably 0.05 to 2 mol/L including water remaining in the fired powder after solid-liquid separation. At this time, the tungsten concentration is adjusted so that the moisture percentage range and the amount of tungsten to be added are as described above.

The tungsten concentration of less than 0.05 mol/L is too low, so as to require a large amount of an alkaline solution to be mixed, and thus slurrying takes place upon mixing with fired powder. Li contained in layered lattices of the fired powder is eluted due to slurrying, so as to cause battery properties to be lowered, and thus this tungsten concentration is unfavorable. On the other hand, when the tungsten concentration exceeds 2 mol/L, alkaline solution is too low in volume and tungsten may not be dispersed uniformly on the surface of the above primary particles.

Furthermore, the alkaline solution (W) is preferably an aqueous solution.

For dispersion of W all over the surface of primary particles, W is required to permeate into internal voids and incomplete grain boundaries within secondary particles. If a solvent such as alcohol having high volatility is used, the solvent is evaporated before permeation of the alkaline solution into internal voids of secondary particles and may not permeate sufficiently.

Meanwhile, when added in the form of a tungsten compound, W can be dispersed on the surface of primary particles owing to water remaining in the lithium-nickel composite oxide and Li eluted from fired powder after solid-liquid separation.

When mixing is performed for uniform dispersion of tungsten into fired powder, a general mixer can be used. For example, a shaker mixer, a Loedige mixer, a Julia Mixer, a V blender or the like is used for mixing to a sufficient degree such that the framework of the lithium-nickel composite oxide is not deformed. In this manner, W can be uniformly distributed on the surface of primary particles of the lithium-nickel composite oxide, even in the form of the alkaline solution (W) or a tungsten compound.

(C-3) Addition to Fired Powder Dried after Water Washing Treatment

Tungsten can be added after drying in a manner similar to that for addition before drying with the use of an alkaline solution (W). At this time, the tungsten concentration of the alkaline solution (W) is specified to be preferably 0.05 to 2 mol/L, and the alkaline solution (W) is preferably added to fired powder after solid-liquid separation at a temperature of 50° C. or lower. At a temperature exceeding 50° C., the alkaline solution is dried rapidly, and thus the alkaline solution may not sufficiently permeate to voids and grain boundaries of secondary particles.

Moreover, if the alkaline solution is dried so quickly that Li elution from the fired powder cannot be expected, and particularly when the alkaline solution (W) contains no Li, a film to be formed on the surface may contain no Li.

When W is added after drying, the W content is not reduced by solid-liquid separation, the whole amount of W added is dispersed on and adheres to the surface of primary particles of fired powder. Hence, the amount of W to be added may be an amount required for the formation of a film on the surface of primary particles.

When any one of the above addition methods is employed, the tungsten content in a film formed on the surface of the composite oxide particles may be decreased to a level lower than the amount of tungsten added because of solid-liquid separation or disintegration after heat treatment described later. However, W may be added in consideration of such an amount of tungsten to decrease. Such an amount of tungsten to decrease can be easily found by a preliminary test or the like. Conditions for addition are made consistent, so that W can be added in a stable amount.

(D) Heat Treatment Step

The heat treatment step is a step of forming a film containing W and Li on the surface of primary particles of a lithium-nickel composite oxide by heat treating the lithium-nickel composite oxide with primary particles having W dispersed on the surface. In this manner, a film containing W and Li supplied in the step of adding tungsten is formed, so that a positive electrode active material for a nonaqueous electrolyte secondary battery having the film containing W and Li on the surface of the primary particles of the lithium-nickel composite oxide can be obtained. Furthermore, in the case of adding to a slurry during water washing treatment, or to fired powder before drying but after water washing treatment, drying can be replaced by the heat treatment step.

The heat treatment method is not particularly limited, and heat treatment is preferably performed at temperatures ranging from 100° C. to 600° C. in an oxygen atmosphere or a vacuum atmosphere, in order to prevent deterioration of electric characteristics when the resultant is used as a positive electrode active material for a nonaqueous electrolyte secondary battery.

If the temperature for heat treatment is lower than 100° C., moisture evaporation is insufficient and a film may not be sufficiently formed. On the other hand, if the temperature for heat treatment exceeds 600° C., primary particles of a lithium-nickel composite oxide undergo sintering and W is partially solid-dissolved in the layer structure of the lithium-nickel composite oxide, and thus the charge and discharge capacity of the battery may be lowered.

To suppress such a decrease in the charge and discharge capacity of the battery, the temperature for heat treatment is specified to be more preferably 550° C. or lower and further preferably 500° C. or lower.

An atmosphere upon heat treatment is preferably an oxidizing atmosphere such as an oxygen atmosphere or a vacuum atmosphere in order to avoid reaction with water or carbonic acid in the atmosphere.

The time for heat treatment is not particularly limited and specified to be preferably 5 to 15 hours for sufficiently evaporating moisture in composite oxide particles to form a film.

The moisture percentage of composite oxide particles after drying is not particularly limited, and is preferably 0.2 mass % or less and more preferably 0.1 mass % or less.

When the moisture percentage of powder exceeds 0.2 mass %, gas components including carbon and sulfur in air are absorbed and a lithium compound may be generated on the surface. In addition, a measured value of the above moisture percentage is a value measured with Karl Fischer moisture meters under conditions of a vaporization temperature of 300° C.

When composite oxide particles aggregate after heat treatment, disintegration is performed to a degree such that the framework of secondary particles is not deformed, so that a positive electrode active material is prepared comprising composite oxide particles having a mean particle diameter ranging from 5 μm to 30 μm.

(3) Nonaqueous Electrolyte Secondary Battery

A nonaqueous electrolyte secondary battery of the present invention is prepared by preparing a positive electrode using a positive electrode active material comprising the above-mentioned lithium-nickel composite oxide, particularly, the lithium-nickel composite oxide obtained by the above production method as a positive electrode active material, and then using the positive electrode. The nonaqueous electrolyte secondary battery has high capacity, high output and high safety.

Hereafter, the structure of the nonaqueous electrolyte secondary battery of the present invention is described.

The nonaqueous electrolyte secondary battery (hereinafter, simply referred to as secondary battery) of the present invention has a structure substantially equivalent to that of a general nonaqueous electrolyte secondary battery except that the positive electrode active material for a nonaqueous electrolyte secondary battery of the present invention (hereinafter, simply referred to as positive electrode active material) is used as a material for a positive electrode.

Specifically, the secondary battery of the present invention has a structure provided with a case, a positive electrode, a negative electrode, a nonaqueous electrolytic solution and a separator accommodated within the case.

More specifically, a positive electrode and a negative electrode are laminated via a separator to form an electrode body, the thus obtained electrode body is impregnated with a nonaqueous electrolytic solution, a positive electrode charge collector of the positive electrode and a positive electrode terminal in communication with the outside are connected using a current collecting lead or the like and a negative electrode charge collector of the negative electrode and a negative electrode terminal in communication with the outside are connected using the same, and the case containing these members therein is sealed, so that the secondary battery of the present invention is formed.

In addition, the structure of the secondary battery of the present invention is of course not limited to the above example, and various outside shapes including a cylindrical shape, a stacked shape, and the like can be employed herein.

(Positive Electrode)

First, a positive electrode that is a feature of the secondary battery of the present invention is described.

The positive electrode is a sheet-shaped member and can be formed by applying a positive electrode combination agent containing the positive electrode active material of the present invention to and drying the surface of a charge collector made of aluminium foil, for example, but a method for preparing the positive electrode is not particularly limited. For example, the positive electrode can also be prepared by causing a strip-shaped positive electrode core material (positive electrode charge collector) to carry a positive electrode combination agent containing particles of the positive electrode active material and a binder.

Furthermore, the positive electrode can be treated adequately depending on a battery to be used. For example, cut treatment for the formation of an appropriate size according to a target battery, and pressurizing and compression treatment using a roll press or the like for increasing the electrode density are performed.

(Positive Electrode Combination Agent)

The positive electrode combination agent can be formed by adding a solvent to a positive electrode agent formed by mixing the positive electrode active material of the present invention in the form of powder, a conductive material and a binder, and then kneading the mixture.

Hereinafter, materials composing the positive electrode combination agent, other than the positive electrode active material, are described.

[Binder]

As a binder for the positive electrode combination agent, any of a thermoplastic resin and a thermosetting resin may be used and a thermoplastic resin is preferable.

Examples of a thermoplastic resin to be used herein include polyethylene, polypropylene, polytetrafluoroethylene (FIFE), poly(vinylidene fluoride) (PVDF), styrene-butadiene rubber, tetrafluoroethylene-hexafluoropropylene copolymer (FEP), tetrafluoroetylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinylether-tetrafluoroethylene copolymer, ethylene-acrylic acid copolymer, ethylene-metacrylic acid copolymer, ethylene-methyl acrylate copolymer, and ethylene-methyl methacrylate copolymer.

The above resins may be used independently or two or more types thereof may be used in combination. In addition, they may be crosslinked resins formed with $Na^+$ ions or the like.

[Conductive Material]

A conductive material for the positive electrode combination agent may be any material with electron conductivity, which is chemically stable within a battery, and is not particularly limited. For example, graphites such as natural graphite (e.g., flaky graphite) and artificial graphite, carbon blacks such as acetylene black, Ketjen black, channel black, furnace black, lamp black, and thermal black, conductive fibers such as carbon fiber and metallic fiber, metal powders such as aluminium, conductive whiskers such as zinc oxide and potassium titanate, conductive metal oxides such as titanium oxide, organic conductive materials such as polyphenylene derivative, and carbon fluoride can be used. They are used independently or two or more types thereof may be used in combination.

In addition, the amount of a conductive material to be added to the positive electrode combination agent is not particularly limited and ranges from preferably 0.5 to 50 mass %, more preferably 0.5 to 30 mass %, and further preferably 0.5 to 15 mass %, with respect to the amount of positive electrode active material particles contained in the positive electrode combination agent.

[Solvent]

The solvent is used for dissolving a binder and dispersing a positive electrode active material, a conductive material or the like in the binder. The solvent is not particularly limited, and an organic solvent such as N-methyl-2-pyrrolidone can be used.

[Positive Electrode Core Material]

The positive electrode core material (positive electrode charge collector) may be any positive electrode core material that is an electronic conductor chemically stable within a battery, and is not particularly limited. For example, a foil or a sheet made of aluminium, stainless steel, nickel, titanium, carbon, conductive resin or the like can be used, and among these examples, an aluminium foil, an aluminium alloy foil and the like are more preferable.

Here, on the surface of a foil or a sheet, a carbon or titanium layer can be provided or an oxide layer can be formed. Moreover, projections or depressions can be provided on the surface of a foil or a sheet, and a net, a punching sheet, a lath material, a porous material, a foamed material, a molded material of a group of fibers and the like can also be used therefor.

The thickness of the positive electrode core material is not particularly limited and preferably ranges from 1 μm to 500 μm, for example.

[Constituents Other than Positive Electrode]

Next, among constituents of the nonaqueous electrolyte secondary battery of the present invention, constituents other than a positive electrode are described.

In addition, the nonaqueous electrolyte secondary battery of the present invention has a feature in that the above positive electrode active material is used, and the other constituents can be adequately selected according to their use and performance required and are not limited to those described below.

[Negative Electrode]

A negative electrode may be any negative electrode capable of charging and discharging lithium and is not particularly limited. For example a negative electrode that can be used herein contains a negative electrode active material and a binder, wherein a negative electrode core material carries a negative electrode combination agent containing a conductive material or a thickener as an arbitrary component. Such a negative electrode can be prepared by a method similar to that for a positive electrode.

A negative electrode active material may be a material capable of electrochemically charging and discharging lithium. For example, graphites, non-graphitizable carbon materials, lithium alloys and the like can be mixed and used. Also, these materials can be used in combination.

The lithium alloy is not particularly limited and is preferably an alloy containing at least one type of element selected from the group consisting of silicon, tin, aluminium, zinc and magnesium.

In addition, the mean particle diameter of the negative electrode active material is not particularly limited and preferably ranges from 1 μm to 30 μm, for example.

[Binder]

As a binder for a negative electrode combination agent, any of thermoplastic resin and thermosetting resin may be used, and a thermoplastic resin is preferable.

Examples of the thermoplastic resin include, but are not particularly limited to, polyethylene, polypropylene, polytetrafluoroethylene (PTFE), poly(vinylidene fluoride) (PVDF), styrene-butadiene rubber, tetrafluoroethylene-hexafluoropropylene copolymer (FEP), tetrafluoroetylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinylether-tetrafluoroethylene copolymer, ethylene-acrylic acid copolymer, ethylene-metacrylic acid copolymer, ethylene-methyl acrylate copolymer, and ethylene-methyl methacrylate copolymer.

These thermoplastic resins may be used independently or two or more types thereof may be used in combination. In addition, they may be crosslinked resins formed with $Na^+$ ions or the like.

[Conductive Material]

The conductive material for a negative electrode combination agent may be any electronically conductive material that is chemically stable within a battery, and is not particularly limited. Examples of such a conductive material that can be used herein include graphites such as natural graphite (e.g., flaky graphite) and artificial graphite, carbon blacks such as acetylene black, Ketjen black, channel black, furnace black, lamp black, and thermal black, conductive fibers such as carbon fiber and metallic fiber, metal powders such as copper and nickel, and organic conductive materials such as polyphenylene derivative. These materials may be used independently or two or more types thereof may be used in combination.

The amount of the conductive material to be added is not particularly limited, and ranges from preferably 1 to 30 mass %, and more preferably 1 to 10 mass % with respect to the amount of negative electrode active material particles contained in the negative electrode combination agent.

[Negative Electrode Core Material]

The negative electrode core material (negative electrode charge collector) may be any electronic conductor that is chemically stable within a battery, and is not particularly limited. For example, a foil or a sheet made of stainless steel, nickel, copper, titanium, carbon, conductive resin or the like can be used and copper and copper alloy are preferred.

On the surface of a foil or a sheet, a layer of carbon, titanium, nickel or the like can be provided or an oxide layer can be formed. Moreover, projections or depressions can be provided on the surface of a foil or a sheet, and a net, a punching sheet, a lath material, a porous material, a foamed material, a molded material of a group of fibers and the like can also be used therefor.

The thickness of the negative electrode core material is not particularly limited and preferably ranges from 1 µm to 500 µm, for example.

[Nonaqueous Electrolytic Solution]

The nonaqueous electrolytic solution is preferably a nonaqueous solvent in which a lithium salt is dissolved.

Examples of the nonaqueous solvent to be used herein include, but are not particularly limited to, cyclic carbonates such as ethylene carbonate (EC), propylene carbonate (PC), butylene carbonate (BC), and vinylene carbonate (VC), chain carbonates such as dimethyl carbonate (DMC), diethyl carbonate (DEC), ethyl methyl carbonate (EMC), and dipropyl carbonate (DPC), aliphatic carboxylic acid esters such as methyl formate, methyl acetate, methyl propionate, and ethyl propionate, lactones such as γ-butyrolactone, and γ-valerolactone, chain ethers such as 1,2-dimethoxyethane (DME), 1,2-diethoxyethane (DEE), and ethoxy-methoxy ethane (EME), cyclic ethers such as tetrahydrofuran, and 2-methyltetrahydrofuran, dimethyl sulfoxide, 1,3-dioxolane, formamide, acetamide, dimethylformamide, dioxolane, acetonitrile, propylnitrile, nitromethane, ethylmonoglyme, phosphoric acid triester, trimethoxymethane, dioxolane derivative, sulfolane, methylsulfolane, 1,3-dimethyl-2-imidazolidinone, 3-methyl-2-oxazolidinone, propylene carbonate derivative, tetrahydrofuran derivative, ethyl ether, 1,3-propanesultone, anisole, dimethyl sulfoxide, and N-methyl-2-pyrrolidone. These nonaqueous solvents may be used independently and two or more types thereof may be used in combination.

In particular, a mixed solvent of cyclic carbonate and chain carbonate, or a mixed solvent of cyclic carbonate, chain carbonate, and aliphatic carboxylic acid ester is preferably used.

[Lithium Salt]

Examples of a lithium salt to be dissolved in a nonaqueous electrolytic solution can include $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lower aliphatic lithium carboxylate, LiCl, LiBr, LiI, lithium chloroborane, lithium tetraphenylborate, and lithium imide salt. These lithium salts may be used independently or two or more types thereof may be used in combination. In addition, at least $LiPF_6$ is preferably used.

Furthermore, the lithium salt concentration in a nonaqueous solvent is not particularly limited and preferably ranges from 0.2 mol/L to 2 mol/L, and more preferably 0.5 mol/L to 1.5 mol/L.

[Other Additives]

Various additives other than a lithium salt may be added to a nonaqueous electrolytic solution in order to improve the charge and discharge characteristics of the battery.

Examples of the additive can include, but are not particularly limited to, triethyl phosphite, triethanolamine, cyclic ether, ethylenediamine, n-glime, pyridine, hexaphosphoric triamide, nitrobenzene derivative, crown ethers, quaternary ammonium salt, and ethylene glycol dialkyl ether.

[Separator]

Furthermore, a fine separator is provided to intervene between a positive electrode and a negative electrode.

The separator is not particularly limited, but is preferably a fine porous thin film having high ionic permeability and predetermined mechanical strength, and being insulative. In particular, the fine porous thin film preferably has a function of blocking pores at a fixed temperature or higher temperatures, so as to increase the resistance.

The material of the fine porous thin film is not particularly limited, and for example, polyolefin such as polypropylene or polyethylene having good resistance to organic solvents and hydrophobicity can be used. Moreover, a sheet produced from glass fiber and the like, nonwoven fabric, woven fabric and the like can also be used.

When the separator is a fine porous thin film, the pore size of pores formed in the separator is not particularly limited and preferably ranges from 0.01 µm to 1 µm, for example. The porosity of the separator is also not particularly limited and generally preferably ranges from 30% to 80%. Moreover, the thickness of the separator is also not particularly limited, and generally preferably ranges from 10 µm to 300 µm.

Furthermore, the separator may be used separately from a positive electrode and a negative electrode, or a polymer electrolyte comprising a nonaqueous electrolytic solution and a polymer material retaining the solution is integrated with a positive electrode or a negative electrode, and thus the resultant can also be used as a separator.

The polymer material may be any polymer material as long as it can retain a nonaqueous electrolytic solution, and is not particularly limited. A copolymer of vinylidene fluoride and hexafluoropropylene is preferable.

EXAMPLES

Hereinafter, the present invention will be further described in detail with reference to examples and comparative examples of the present invention, but the present invention is not limited by these examples.

In addition, in examples and comparative examples, the following methods were employed for analyzing the metals of lithium-nickel composite oxides and measuring c-axis lengths.

(1) Analysis of metal: Analyzed by ICP emission analysis method.

(2) Measurement of c-axis length: X-ray diffracttometer (XRD) (PANalytical: X'Pert PRO)

[Method for Preparing Secondary Battery for Evaluation of Battery Performance]

For evaluation of the battery performance of nonaqueous electrolyte secondary batteries for which the lithium-nickel composite oxides of the present invention had been used as positive electrode active materials, a 2032 coin type battery (hereinafter, referred to as coin type battery 1) shown in FIG. 2 was used.

Figure 2:
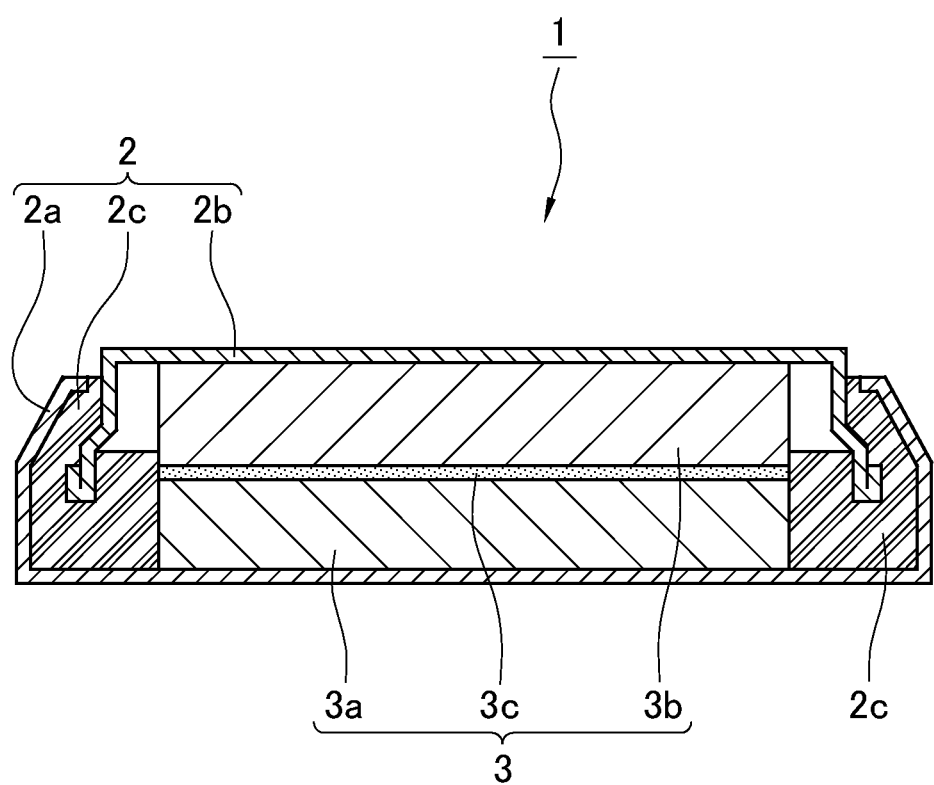
FIG. 2 is a schematic cross-sectional view showing a coin type battery 1 used for evaluation of batteries.

As shown in FIG. 2, the coin type battery 1 is composed of a case 2 and an electrode 3 accommodated within the case 2.

The case 2 has a positive electrode can 2a that is hollow and has an open end, and a negative electrode can 2b that is disposed at the opening of the positive electrode can 2a, which is configured so that when the negative electrode can 2b is disposed at the opening of the positive electrode can 2a, a space for accommodating an electrode 3 is formed between the negative electrode can 2b and the positive electrode can 2a.

The electrode 3 is comprised of a positive electrode (electrode for evaluation) 3a, a separator 3c and a negative electrode (lithium metal negative electrode) 3b, which are laminated in this order, wherein the case 2 accommodates these members so that the positive electrode 3a is in contact with the inner face of the positive electrode can 2a, and the negative electrode 3b is in contact with the inner face of the negative electrode can 2b.

In addition, the case 2 is provided with a gasket 2c. The gasket 2c fixes the relative movement of the positive electrode can 2a and the negative electrode can 2b so that 2a and 2b are always not in contact with each other. Furthermore the gasket 2c also has a function of sealing the gap between the positive electrode can 2a and the negative electrode can 2b and thus air-tightly and fluid-tightly blocking the interior and the exterior of the case 2.

The above coin type battery 1 was prepared by the following production method.

First, 5 parts by weight of acetylene black and 5 parts by weight of polyvinylidene fluoride were mixed with 90 parts by weight of positive electrode active material powder, and then n-methylpyrrolidone was added to prepare a paste.

The thus prepared paste was applied to an aluminium foil having a thickness of 20 μm. In addition, the paste was applied so that the weight of the positive electrode active material was 0.05 g/cm$^2$ after drying.

Subsequently, the aluminium foil coated with the paste was subjected to vacuum drying at 120° C., and then punched punched into a disk shape with a diameter of 1 cm to form a positive electrode 3a.

The above coin type battery 1 was prepared using the positive electrode 3a, the negative electrode 3b, the separator 3c and an electrolytic solution within a glove box under an Ar atmosphere where the dew point was controlled to be −80° C.

In addition, lithium metal punched into a disk shape with a diameter of 15 mm was used for the negative electrode 3b.

A polyethylene porous film with a film thickness of 20 μm was used for the Separator 3c.

A mixed solution (Ube Industries, Ltd.) of ethylene carbonate (EC) and diethyl carbonate (DEC) mixed in equal amounts, containing 1M LiClO$_4$ as a supporting electrolyte, was used as an electrolytic solution.

The thus prepared coin type battery was used for evaluation of battery properties.

Battery properties were found by measuring initial discharge capacity and positive electrode reaction resistance.

Initial discharge capacity was measured by the following method.

First, coin type battery 1 was left to stand for about 24 hours after preparation.

After open circuit voltage OCV was stabilized, current density for the positive electrode was set at 0.1 mA/cm2, charging was performed to a cutoff voltage of 4.3V, 1 hour of quiescent time was provided, and then discharging was performed to a cutoff voltage of 3.0V. The capacity when discharging had been performed to a cutoff voltage of 3.0V was designated as the initial discharge capacity.

Next, positive electrode reaction resistance was calculated by the following method.

Figure 3:
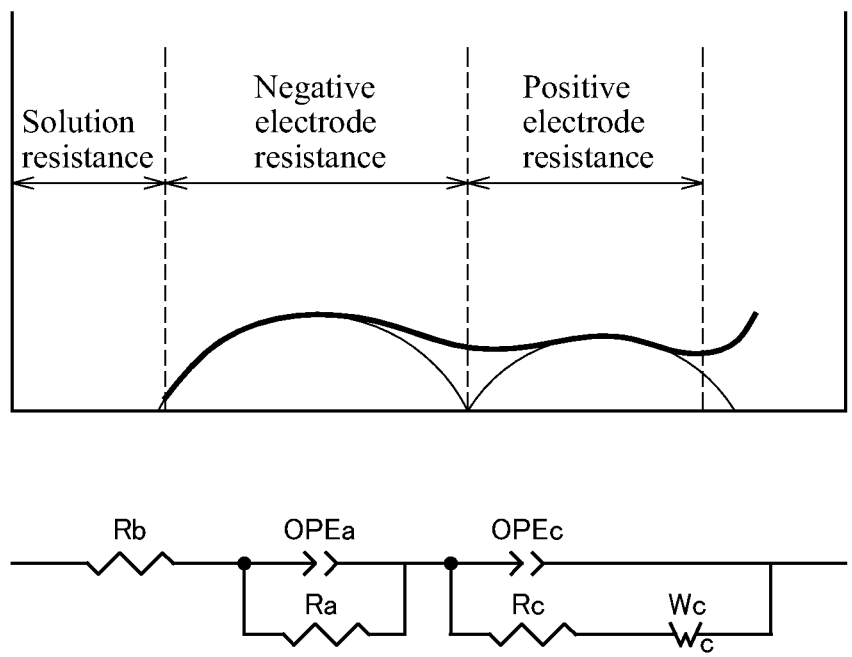
FIG. 3 is a schematic diagram showing an example of measurement for impedance evaluation and an equivalent circuit used for analysis.

First, the coin type battery of each example was charged with charging potential of 4.1 V, and then electrical resistance was measured by an alternating-current impedance method using a frequency response analyzer and potentiogalvanostat (Solartron analytical, 1255B). Results showing the relationship between measured mechanisms and frequencies were plotted on a graph, so that a Nyquist plot was obtained as shown in FIG. 3.

The Nyquist plot represents the sum of solution resistance, negative electrode resistance and its capacity, and, positive electrode resistance and its capacity indicated by characteristic curves. Fitting calculation was performed using equivalent circuits based on the Nyquist plot, so that the values of positive electrode reaction resistance were calculated.

Example 1

First, the temperature within a reactor was set at 49.5° C., an aqueous mixed solution of nickel sulfate and cobalt sulfate, an aqueous sodium aluminate solution, and 25 mass % ammonia water were added to a reaction solution while maintaining the reaction solution within the reactor at pH13.0 based on the solution temperature of 25° C. with the use of a 20 mass % sodium hydroxide solution, and then the resultant was collected by overflow. Furthermore, the resultant was washed with a 45 g/L aqueous sodium hydroxide solution with pH of pH12.5 based on the solution temperature of 25° C., subjected to water washing, and then dried, so that nickel composite hydroxide was obtained (neutralization crystallization method).

The nickel composite hydroxide consisted of secondary particles in the form of spheres resulting from aggregation of a plurality of primary particles having a size of 1 μm or less. The nickel composite hydroxide was confirmed to have a molar ratio of Ni:Co:Al of 94:3:3, as analyzed by the ICP method.

The nickel composite hydroxide was found to have a volume-based mean particle diameter MV of 13 μm as measured by a laser diffraction and scattering method.

Furthermore, sulfur was quantitatively analyzed by an ICP emission analysis method. Specifically, the value of sulfur was found by multiplying by a coefficient under assumption that all sulfur elements were oxidized to be sulfate radicals (SO4), and thus the sulfate radical content was found to be 0.28 mass %. Sulfate radical contents of nickel composite hydroxides are shown in Table 1.

Next, the nickel composite hydroxide was subjected to oxidation roasting under an air atmosphere at a temperature of 600° C. to give nickel composite oxide, the nickel composite oxide and the lithium hydroxide-hydrate were weighed and mixed so that the molar ratio was Ni:Co:Al:Li=0.94:0.03:0.03:1.025, thereby obtaining a lithium mixture.

The thus obtained lithium mixture was calcined using an electric furnace under an oxygen atmosphere at a temperature of 500° C. for 3 hours, kept at 745° C. for 3 hours, and then fired for 20 hours, the time period ranging from the start of temperature rise to the end of keeping. Subsequently, the mixture was cooled to room temperature within the furnace, and then subjected to disintegration treatment, thereby obtaining fired powder (hereinafter, referred to as base material) to be subjected to addition of a tungsten compound.

The thus obtained base material was analyzed by the ICP method, and thus confirmed to have a molar ratio of Ni:Co:Al:Li of 0.94:0.03:0.03:1.024.

Next, pure water at 20° C. was added to the obtained base material, so as to obtain a slurry containing 750 g of the base material per liter of water. The slurry was stirred for 20 minutes, passed through a filter press, and then dehydrated, thereby preparing base material cake.

Tungsten was added to the base material by a method that involves passing an alkaline solution (W) containing a tungsten compound through the dehydrated base material cake in the filter press, dehydrating again, and then dispersing W on the surface of the primary particles of the base material.

Here, the amount of the tungsten compound to be added is determined depending on the tungsten concentration in an alkaline solution (W) to be passed through and the moisture percentage of dehydrated base material cake. Specifically, the amount of the tungsten compound to be added is the amount of tungsten contained in water after dehydration.

In this example, an alkaline solution (W) having a tungsten concentration of 0.34 mol/L, which had been prepared by adding 78.5 g of tungsten oxide ($WO_3$) to an aqueous solution containing 30 g of lithium hydroxide ($LiOH \cdot H_2O$) dissolved per liter of pure water, was used.

The moisture percentage of dehydrated base material cake was 8.2%.

The obtained lithium-nickel composite oxide impregnated with the alkaline solution (W) was subjected to ventilation drying using a vacuum dryer heated at 190° C. for 10 hours.

The resultant was finally disintegrated using a sieve with aperture of 38 μm, so that a positive electrode active material having a film containing W and Li on the surface of primary particles was obtained.

The obtained positive electrode active material was analyzed for composition by the ICP method, and confirmed to have a molar ratio of Ni:Co:Al:Li of 0.94:0.03:0.03:0.99, and a tungsten content of 0.28 atom % with respect to the total number of Ni, Co and Al atoms.

Furthermore, the specific surface area of the obtained positive electrode active material was 0.93 $m^2/g$ as measured by the BET method.

The obtained positive electrode active material was treated so as to enable cross-sectional observation by scanning transmission electron microscopy (STEM). Then areas in the vicinity of the surface of primary particles were observed by STEM. It was thus confirmed that coating with a 2-nm to 115-nm thick film of a compound containing lithium and tungsten was formed on the surface of the primary particles, and that the compound was lithium tungstate. Moreover, the positive electrode active material embedded in a resin, and then processed by cross section polisher was subjected to cross-sectional observation by SEM (magnification: 5000×). The percentage of voids of secondary particles was found by this observation to be 2.1%.

[Battery Evaluation]

The obtained positive electrode active material was evaluated for battery properties. In addition, a value of evaluation for positive electrode resistance was a value relative to the value found in example 1 designated as 1.00.

Hereinafter, in examples 2 to 7 and comparative examples 1 to 4, only substances and conditions changed from those in the above example 1 are shown. Moreover, values of the evaluation of discharge capacity and positive electrode resistance in examples 1 to 7 and comparative examples 1 to 4 are listed in Table 1.

Example 2

Except that cake was dehydrated to have a moisture percentage of 11.0% after an alkaline solution (W) had been passed therethrough, a positive electrode active material was obtained and evaluated in a manner similar to example 1. The result is shown in Table 1.

Example 3

Except that crystallization was performed so that the nickel composite hydroxide had a molar ratio of Ni:Co:Al of 91:6:3, a positive electrode active material was obtained and evaluated in a manner similar to example 1. The result is shown in Table 1.

Example 4

Except that crystallization was performed so that the nickel composite hydroxide had a molar ratio of Ni:Co:Al of 88:9:3, and firing temperature was changed from 745° C. to 760° C., a positive electrode active material was obtained and evaluated in a manner similar to example 1. The result is shown in Table 1.

Example 5

Except that crystallization was performed so that the nickel composite hydroxide had a molar ratio of Ni:Co:Al of 91:6:3, and a 10 g/L aqueous sodium carbonate solution with pH of 11.0 based on the solution temperature of 25° C. was used as an aqueous sodium hydroxide solution for washing after collection by overflow, a positive electrode active material was obtained and evaluated in a manner similar to example 1. The result is shown in Table 1.

Example 6

Except that crystallization was performed so that the nickel composite hydroxide had a molar ratio of Ni:Co:Al of 88:9:3, and a 65 g/L aqueous sodium hydroxide solution with pH of 13.5 based on the solution temperature of 25° C. was used as an aqueous sodium hydroxide solution for washing after collection by overflow, a positive electrode active material was obtained and evaluated in a manner similar to example 1. The result is shown in Table 1.

Example 7

Except that a 10 g/L aqueous sodium hydroxide solution with pH of 10.5 based on the solution temperature of 25° C. was used as an aqueous sodium hydroxide solution for washing after collection by overflow, a positive electrode active material was obtained and evaluated in a manner similar to example 1. The result is shown in Table 1.

Comparative Example 1

Except that crystallization was performed so that the nickel composite hydroxide had a molar ratio of Ni:Co:Al of 82:15:3, and the firing temperature was changed from 745° C. to 760° C., a positive electrode active material was obtained and evaluated in a manner similar to example 1. The result is shown in Table 1.

Comparative Example 2

Except that crystallization was performed so that the nickel composite hydroxide had a molar ratio of Ni:Co:Al of 91:6:3, and no alkaline solution (W) containing a tungsten compound was passed through a filter press, a positive electrode active material was obtained and evaluated in a manner similar to example 1. The result is shown in Table 1.

Comparative Example 3

Except that no alkaline solution (W) containing a tungsten compound was passed through a filter press, a positive electrode active material was obtained and evaluated in a manner similar to example 1. The result is shown in Table 1.

Comparative Example 4

Except that crystallization was performed so that the nickel composite hydroxide had a molar ratio of Ni:Co:Al of 88:9:3, and the firing temperature was changed from 745° C. to 790° C., a positive electrode active material was obtained and evaluated in a manner similar to example 1. The result is shown in Table 1.

TABLE 1

| | Composition [Molar ratio of Ni:Co:Al] | Sulfate radical content [wt %] | Firing temperature [° C.] | Amount of W [mol %] | After water washing Li/M | c-axis length [Å] | Specific surface area [m²/g] | Porosity [%] | Discharge capacity [mAh/g] | Positive electrode resistance |
|---|---|---|---|---|---|---|---|---|---|---|
| Example 1 | 94:3:3 | 0.28 | 745 | 0.28 | 0.99 | 14.199 | 0.93 | 2.1 | 223 | 1.00 |
| Example 2 | 94:3:3 | 0.28 | 745 | 0.52 | 0.99 | 14.199 | 0.75 | 0.8 | 218 | 1.04 |
| Example 3 | 91:6:3 | 0.26 | 745 | 0.28 | 0.99 | 14.195 | 0.95 | 2.2 | 216 | 1.07 |
| Example 4 | 88:9:3 | 0.26 | 760 | 0.28 | 0.98 | 14.191 | 0.96 | 2.2 | 213 | 1.07 |
| Example 5 | 91:6:3 | 0.12 | 745 | 0.26 | 0.99 | 14.193 | 0.45 | 0.5 | 215 | 1.03 |
| Example 6 | 88:9:3 | 0.06 | 745 | 0.25 | 0.99 | 14.183 | 0.32 | 0.3 | 213 | 1.14 |
| Example 7 | 94:3:3 | 0.51 | 745 | 0.29 | 0.99 | 14.205 | 1.24 | 5.3 | 215 | 1.15 |
| Comparative example 1 | 82:15:3 | 0.27 | 760 | 0.28 | 0.99 | 14.183 | 0.97 | 2.8 | 201 | 1.25 |
| Comparative example 2 | 91:6:3 | 0.26 | 745 | — | 0.99 | 14.195 | 1.05 | 3.3 | 210 | 1.96 |
| Comparative example 3 | 94:3:3 | 0.28 | 745 | — | 0.98 | 14.199 | 1.08 | 3.5 | 211 | 1.70 |
| Comparative example 4 | 88:9:3 | 0.26 | 790 | 0.25 | 0.98 | 14.182 | 0.31 | 0.1 | 199 | 1.33 |

[Evaluation]

As is clear from Table 1, the positive electrode active materials of examples 1 to 7 were produced according to the present invention, so that these materials had high discharge capacity and low positive electrode resistance compared to comparative examples 1 to 4, and were high capacity and high output positive electrode active materials for a nonaqueous electrolyte secondary battery.

INDUSTRIAL APPLICABILITY

The nonaqueous electrolyte secondary battery obtained according to the present invention has high capacity and high safety, and thus is suitable for secondary batteries capable of charging and discharging, which are particularly used for small portable electronic equipment (such as note-type personal computers and cellular phone terminals).

REFERENCE SIGNS LIST

1 Coin type battery
2 Case
2*a* Positive electrode can
2*b* Negative electrode can
2*c* Gasket
3 Electrode
3*a* Positive electrode
3*b* Negative electrode
3*c* Separator
11 Secondary particles
12 Primary particles
13 Film
P Conduction path

The invention claimed is:

1. A positive electrode active material for a nonaqueous electrolyte secondary battery, comprising primary particles of a lithium-nickel composite oxide represented by the following general formula (1) and secondary particles composed by aggregation of the primary particles, wherein
   a membranous covering having a thickness of 1 nm to 200 nm and containing W and Li is present at least on the surface of the primary particles exposed on the outer face of the secondary particles and the surface of the primary particles exposed to internal voids of the secondary particles, and
   a c-axis length in the crystal of the lithium-nickel composite oxide is 14.183 angstroms or more and 14.205 angstroms or less, as determined by Rietveld analysis on X-ray diffraction.

(Chemical formula 1)

$$\text{General formula: } Li_bNi_{1-x-y}Co_xM_yO_2 \quad (1)$$

(In the formula, M is at least one type of element selected from Mg, Al, Ca, Ti, V, Cr, Mn, Nb, Zr and Mo, b is a numerical value satisfying $0.95 \leq b \leq 1.03$, x is a numerical value satisfying $0 < x \leq 0.15$, y is a numerical value satisfying $0 < y \leq 0.07$, and x+y is a numerical value satisfying $x+y \leq 0.16$.)

2. The positive electrode active material for a nonaqueous electrolyte secondary battery according to claim 1, wherein void parts to be determined by the cross-sectional observation of the secondary particles are portions where the lithium-nickel composite oxide represented by general formula (1) is absent in the cross section of the secondary particles, and a porosity calculated with the void parts ranges from 0.5% to 4.0%.

3. The positive electrode active material for a nonaqueous electrolyte secondary battery according to claim 1, wherein the number of tungsten atoms contained in the membranous covering containing tungsten and lithium accounts for 0.1 atom % to 3.0 atom % with respect to the total number of Ni, Co and M atoms contained in the lithium-nickel composite oxide of the primary particles.

4. The positive electrode active material for a nonaqueous electrolyte secondary battery according to claim 1, which is represented by the following general formula (2).

(Chemical formula 2)

$$\text{General formula: } Li_bNi_{1-x-y}Co_xM_yW_zO_{2+\alpha} \quad (2)$$

(In the formula, M is at least one type of element selected from Mg, Al, Ca, Ti, V, Cr, Mn, Nb, Zr and Mo, and b is a numerical value satisfying $0.95<b\leq1.10$, x is a numerical value satisfying $0<x\leq0.15$, y is a numerical value satisfying $0<y\leq0.07$, x+y is a numerical value satisfying $x+y\leq0.16$, z is a numerical value satisfying $0.001\leq z\leq0.03$, and $\alpha$ is a numerical value satisfying $0\leq\alpha\leq0.2$.)

5. The positive electrode active material for a nonaqueous electrolyte secondary battery according to claim 1, wherein W and Li contained in the membranous covering are present in the form of lithium tungstate.

6. The positive electrode active material for a nonaqueous electrolyte secondary battery according to claim 1, wherein the lithium-nickel composite oxide has a mean particle diameter ranging from 5 μm to 30 μm.

7. The positive electrode active material for a nonaqueous electrolyte secondary battery according to claim 1, which has the membranous covering on the surface of the primary particles, and has fine particles containing tungsten and lithium and having a diameter ranging from 1 nm to 200 nm.

8. A nonaqueous electrolyte secondary battery, which has a positive electrode containing the positive electrode active material for a nonaqueous electrolyte secondary battery according to claim 1.

* * * * *